United States Patent

Ohzeki et al.

[11] Patent Number: 5,926,575
[45] Date of Patent: Jul. 20, 1999

[54] MODEL-BASED CODING/DECODING METHOD AND SYSTEM

[75] Inventors: Kazuo Ohzeki; Hiroshi Harashima, both of Tokyo; Masahide Kaneko, Inagi; Takahiro Saito, Yokohama, all of Japan

[73] Assignees: Telecommunications Advancement Organization of Japan, Tokyo; Kabushiki Kaisha Toshiba, Kawasaki, both of Japan

[21] Appl. No.: 08/746,291

[22] Filed: Nov. 7, 1996

[30] Foreign Application Priority Data

Nov. 7, 1995  [JP]  Japan .................................. 7-288917

[51] Int. Cl.$^6$ ...................................................... G06K 9/46
[52] U.S. Cl. ............................................. 382/243; 382/118
[58] Field of Search .................................... 382/118, 243, 382/241, 239; 348/15, 19; 345/430, 441, 445

[56] References Cited

U.S. PATENT DOCUMENTS

| 5,649,086 | 7/1997 | Belfer et al. | 345/441 |
| 5,740,343 | 4/1998 | Tarolli et al. | 345/430 |
| 5,774,129 | 6/1998 | Poggio et al. | 345/441 |

OTHER PUBLICATIONS

K. Aizawa, et al., Signal Processing: Image Communication I, vol. 1, No. 2, pp. 139–152, "Model–Based Analysis Synthesis Image Coding (MBASIC) System for a Person's Face", Oct. 1989.

Masahide Kaneko, et al., Journal of Visual Communication and Image Representation, vol. 2, No. 1, pp. 39–54, "Coding of Facial Image Sequence Based on a A 3–D Model of the Head and Motion Detection", Mar. 1991.

Haibo Li et al., IEEE Transactions on Image Processing, vol. 3, No. 5, pp. 589–609, "Image Sequence Coding at Very Low Bitrates: A Review", Sep. 1994.

*Primary Examiner*—Christopher S. Kelley
*Attorney, Agent, or Firm*—Oblon, Spivak, McClelland, Maier & Neustadt, P.C.

[57] ABSTRACT

A processing of causing a face image of a person A as an object of encoding to be deformed in correspondence to expression and motion of a face image of a person B as a reference image. The expression change and the motion from the model wire-frame are treated as fitting information, and this fitting information is made WA1 with respect to a first image of an object for photographing, while is made Wb1 with respect to a second image of an object for photographing. For example, the fitting information from a model wire-frame W00 to an image A1 is Wa1, and the fitting information from the image A1 to the model wire-frame W00 is Wa1. Next, an image A2 into which the first image A1 is caused to be deformed by a texture Ta1 of the first image A1 and a wire-frame function Wb1 Wa1 is obtained through composition. Texture mapping of sticking the texture Ta1 in correspondence to each of small areas of this wire-frame is carried out, whereby the image A2 into which the image A1 is caused to be deformed similarly to an image B1 is obtained through composition.

8 Claims, 19 Drawing Sheets

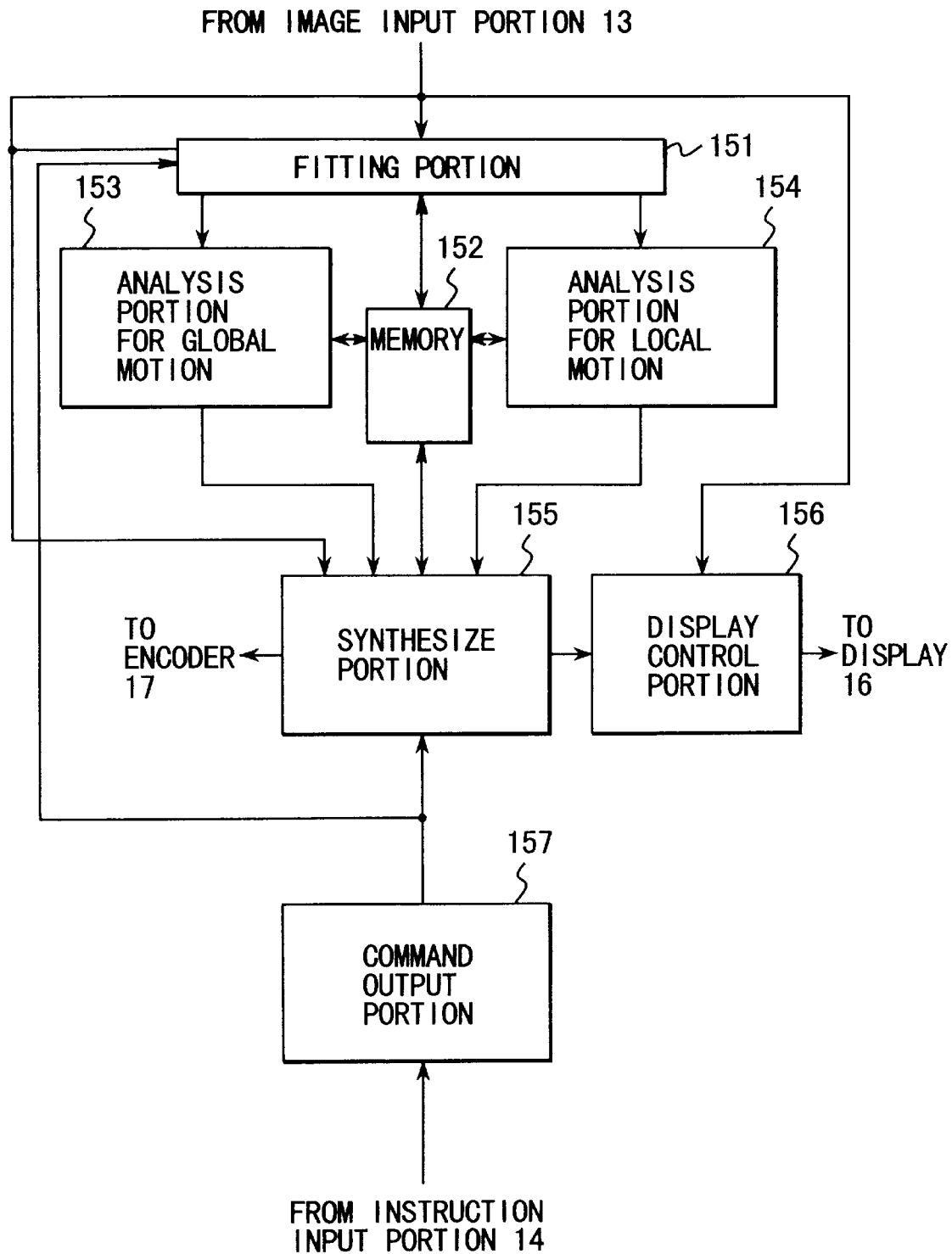
F I G. 2

FIG. 4A
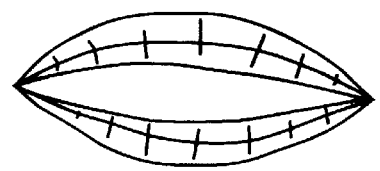
FIG. 4B
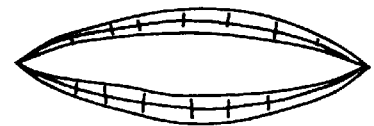
FIG. 4C
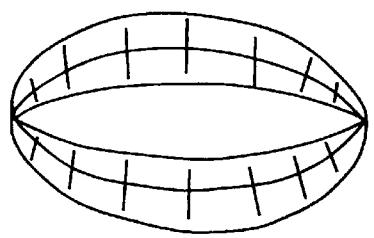
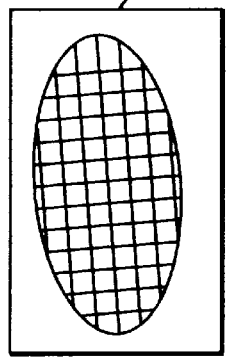
(Wb1, Ta1)
FIG. 5A
(PRIOR ART)
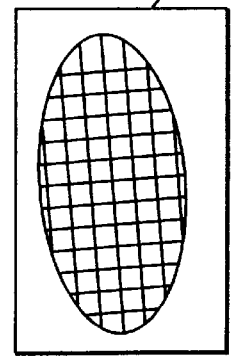
(Wb2, Ta1)
FIG. 5B
(PRIOR ART)

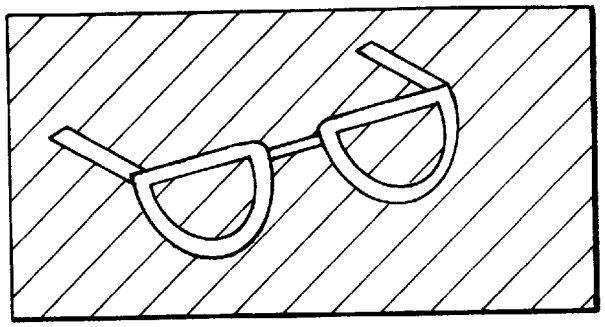
FIG. 11
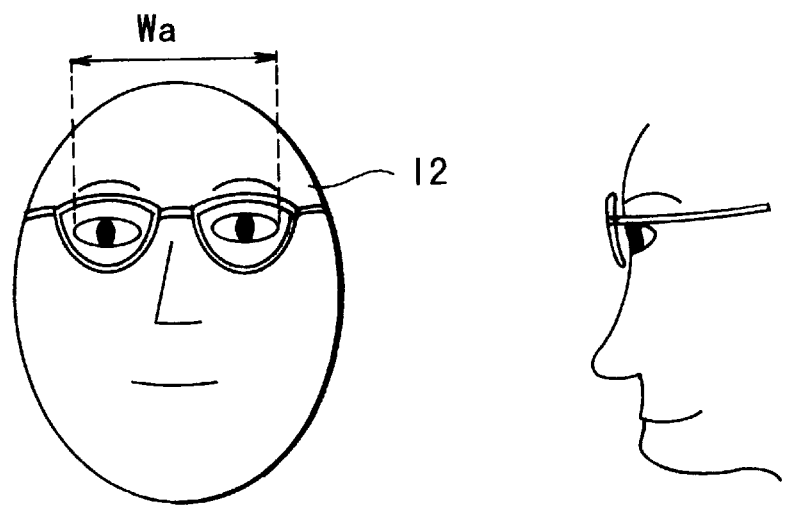
FIG. 12A          FIG. 12B
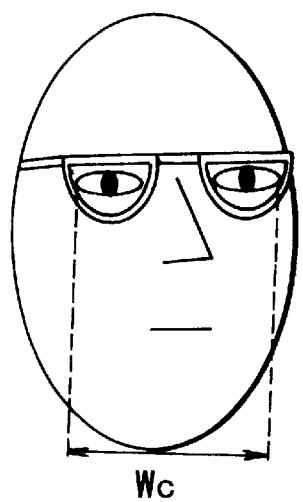      
FIG. 12C          FIG. 12D

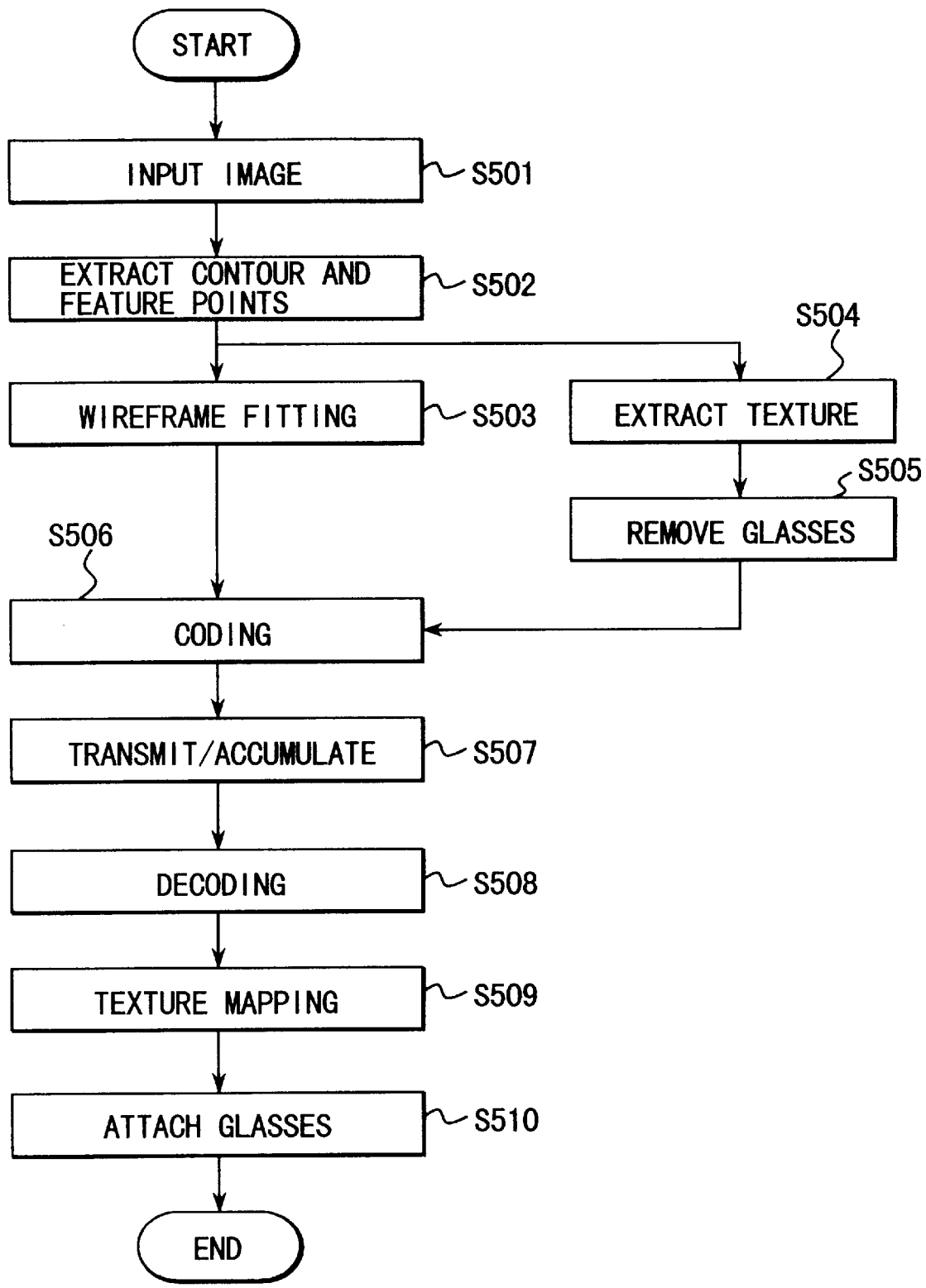
F I G. 16

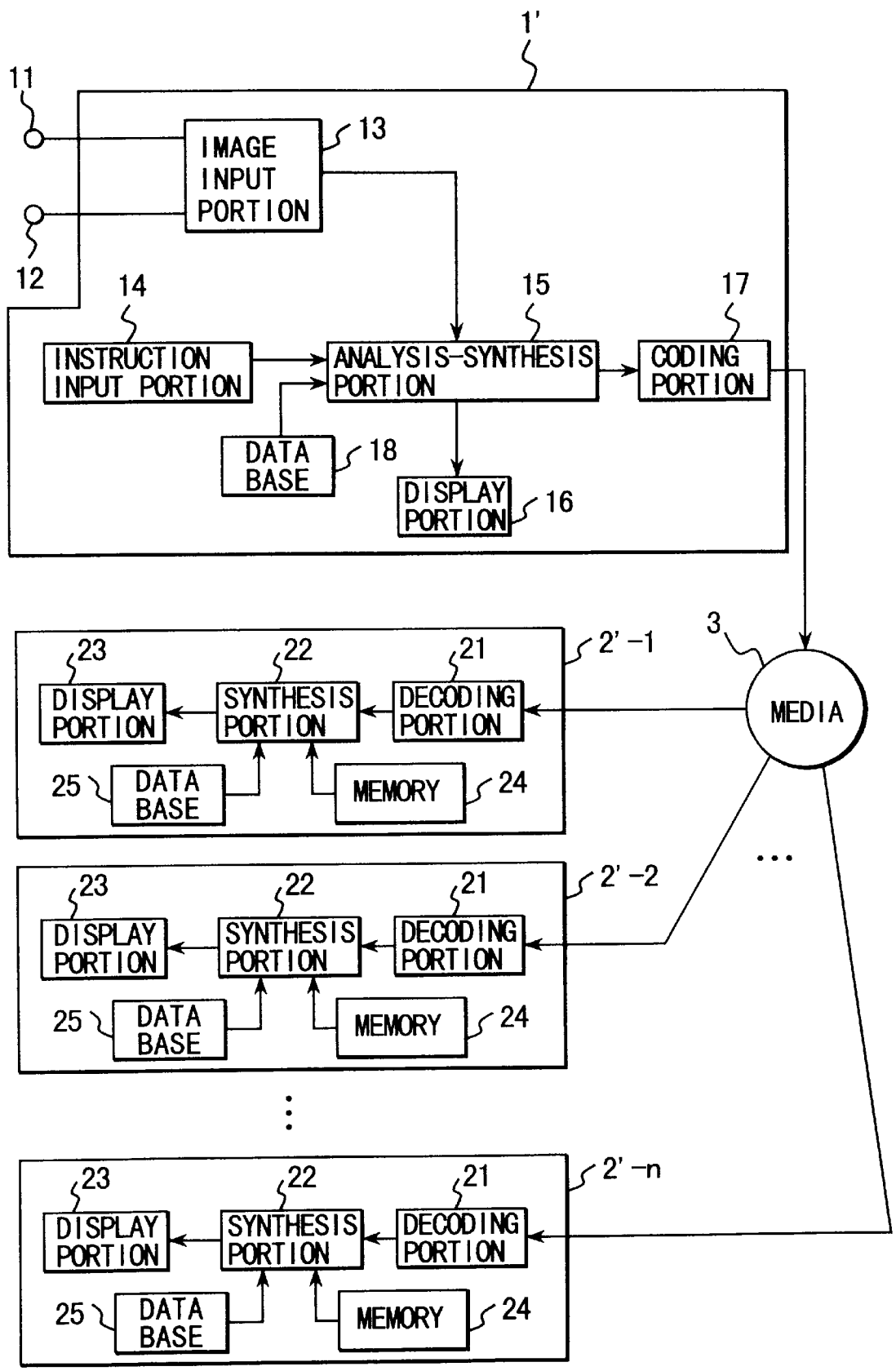
F I G. 17

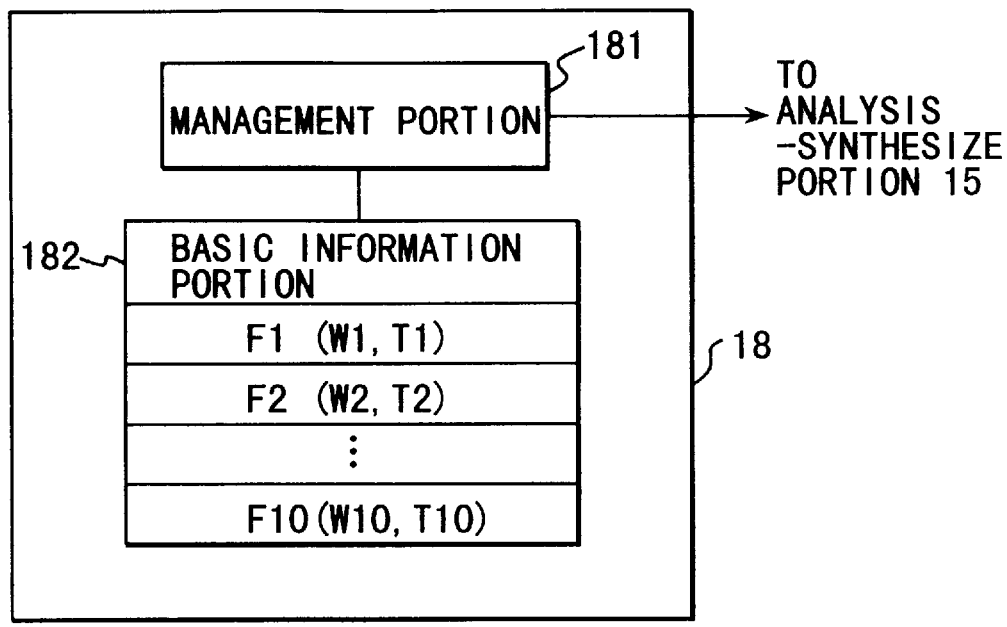
F I G. 18
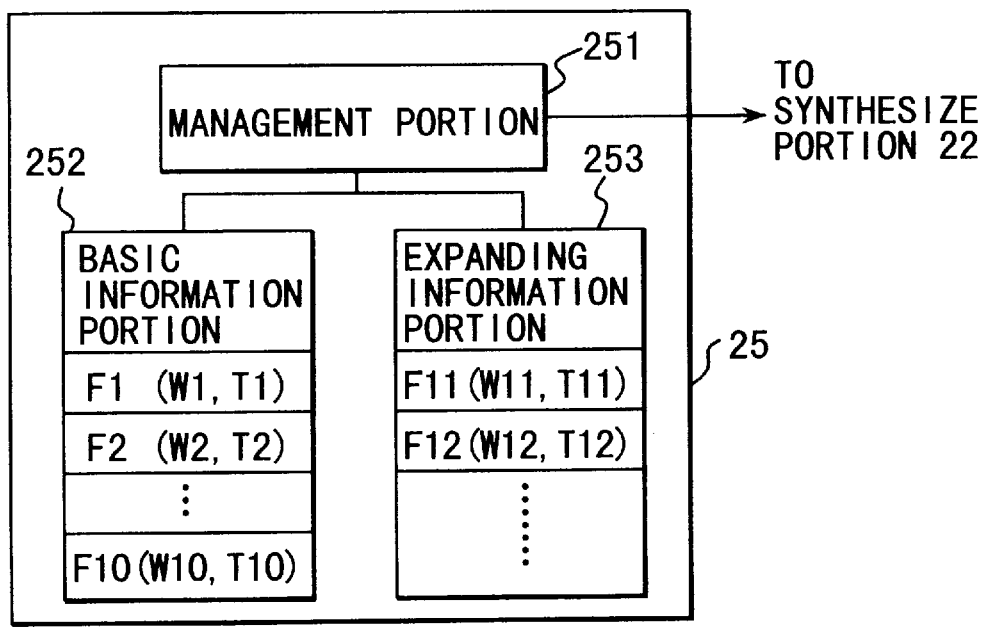
F I G. 19

MODEL-BASED CODING/DECODING METHOD AND SYSTEM

BACKGROUND OF THE INVENTION

1. Field of the Invention

The present invention relates to a model-based coding/decoding method and a system for coding or decoding a face image, and more in particular to a model-based coding/decoding method and a system capable of coding or decoding a face image including an expression and motion accurately with a small amount of data.

2. Description of the Related Art

Conventionally, the high-efficiency coding of an image is basically performed by full automatic processing. This is because a vast amount and great variety of types of images to be coded are required to be processed in a sophisticated, complicated real-time way in all the applications including facsimile, TV conference, image monitor and video disk. The full automatic processing, however, limits the technical development to waveform coding and the improvement in coding efficiency has reached its limit.

A model-based coding scheme is intended to improve the coding efficiency further. A representative model-based coding scheme is an analysis-synthesis type of coding scheme. In the analysis-synthesis type of coding scheme, face image information constituting an input image is analyzed according to a predetermined image model called a wire-frame model. Specifically, the contour of the face and the feature points including the end points of the eyes and the end points of the mouth are extracted, used as analysis parameters and tracked temporally. The analysis parameters thus extracted are coded in high efficiency together with the texture information such as the initial face image and output to media such as a transmission path and a storage medium. At decoding end, the original image information is decoded from the analysis parameters and texture information transmitted or stored by media using the same wire-frame model as the one prepared at coding end.

The advantage of this analysis-synthesis type of coding scheme is that it can express an image using a small number of analysis parameters and a small amount of texture information on the initial image and therefore the coding is possible at a very low bit rate.

The conventional analysis-synthesis type of coding scheme, however, poses the problems described below.

In the model-based coding of a face image by the analysis-synthesis type of coding scheme, it may be required that the facial expression and the motion of a face image of another person, for example, an actor or an actress appearing on TV or movie (hereinafter referred to as a reference image) is fitted in the face image to be coded such as a face image of the user picked up by the camera. In such a case, the conventional method assumes that both the initial image to be coded and the initial reference image are expressionless. In the case where a facial expression appears in the initial image of the image to be coded or the reference image, therefore, the correspondence between the analysis parameters and the parameters of the wire-frame model is disrupted, so that proper coding becomes impossible. As a result, a correct facial expression and motion cannot be presented in a decoded face image.

Also, since the initial image and the wire-frame model are both singular in number, the model-based coding of an image of a rigid object like a pair of glasses overlapped on a soft object such as a face poses the problem of transforming the glasses undesirably with the change in facial expression.

A vast amount of data is required for sending out a plurality of face images (several hundred face images, for example) representing the motion such as the change in facial expression. This consumes considerable time for data transfer from the transmitting end to the decoding end.

SUMMARY OF THE INVENTION

In the light of the foregoing problems associated with the prior art, it is a first object of the present invention to provide a model-based coding/decoding method of coding or decoding precisely an image of an object of coding in correspondence to expression and motion of a reference image, and a system for use in such a method.

It is a second object of the present invention to provide a model-based coding/decoding method which is capable of subjecting an image of an object of coding containing therein an image of an object for photographing, in which a rigid object partially overlaps with a soft object, to model-based coding without accompanying unnatural deformation of the rigid object, and a system for use in such a method.

It is a third object of the present invention to provide a model-based coding/decoding method which is capable of carrying out precise coding and decoding with a small amount of data when transmitting an image of an object of coding from a transmission side to a reception side, and a system for use in such a method.

It is a fourth object of the present invention to provide an interactive model-based coding system and a program which are suitable for carrying out interactively model-based coding of an image.

According to a first aspect of the present invention, there is provided a coding method in a system having a standard wire-frame for receiving both a first image of an object for photographing and a second image of an object for photographing in order to cause the first image of an object for photographing to be deformed in accordance with the second image of an object for photographing, the coding method including the steps of: obtaining a wire-frame function W1 from a first wire-frame which is fitted to an object for photographing of the first image of an object for photographing to the standard wire-frame; obtaining a wire-frame function W2 from the standard wire-frame to a second wire-frame which is fitted to an object for photographing of the second image of an object for photographing; and making a product of an inverse function W1 of the wire-frame function W1 and the wire-frame function W2 a wire-frame function W3 in order to code both a texture of the first image of an object for photographing and the wire-frame function W3.

According to a second aspect of the present invention, there is provided a decoding method in a system having a standard wire-frame for determining a first image of an object for photographing in accordance with a second image of an object for photographing, the decoding method including the steps of: inputting both a wire-frame function W3 which is a product of an inverse function of a wire-frame function W1 from a first wire-frame fitted to an object of the first image of an object for photographing to the standard wire-frame, and a wire-frame function W2 from the standard wire-frame to a second wire-frame fitted to an object for photographing of the second image of an object for photographing, the wire-frame function being encoded, and a texture of the first image of an object for photographing which has been encoded; decoding both the wire-frame function W3 and the texture which have been inputted; and causing the standard wire-frame to be deformed in accordance with both the texture of the first image of an object for photographing which has been decoded and the wire-frame function W3 which has been decoded.

By adopting such a structure, it is possible to provide a model-based coding/decoding method of coding or decoding precisely an image of an object of coding in correspondence to expression and motion of a reference image.

According to a third aspect of the present invention, there is provided a method of coding an image containing therein an image of an object for photographing in which a rigid object partially overlaps with a soft object, including the steps of: removing the rigid object on the image; obtaining a motion parameter which is used to cause the soft object on the image to be deformed into a desired soft object; and coding the rigid object which has been removed, a texture of the soft object and the motion parameter.

According to a fourth aspect of the present invention, there is provided a method of decoding an image containing therein an image of an object for photographing in which a rigid object partially overlaps a soft object, including the steps of: inputting the rigid object which has been encoded, a texture from which the rigid object is removed, a motion parameter which is used to cause the soft object to be deformed into a desired soft object; causing the soft object to be deformed into the desired soft object in accordance with the motion parameter; and overwriting the rigid object on the desired soft object.

By adopting such a structure, it is possible to provide a model-based coding/decoding method which is capable of subjecting an image of an object of coding containing therein an image of an object for photographing, in which a rigid object partially overlaps with a soft object, to model-based coding without accompanying unnatural deformation of the rigid object.

According to a fifth aspect of the present invention, there is provided a network including: a transmission unit; a plurality of terminals; and a data transmission path through which the transmission unit is connected to the plurality of terminals, wherein the transmission unit includes: a first input unit for inputting an image containing therein an image of an object for photographing; a first storage unit for storing therein a plurality of information of different objects for photographing; a calculation unit for calculating a combination ratio with which the plurality of information of different objects for photographing stored in the first storage is combined with one another so as for the image of an object for photographing inputted to the first input unit to be shown; and a transmission unit for transmitting the combination ratio calculated by the calculation unit to the desired terminal or terminals of the plurality of terminals through the data transmission path, and each of the plurality of terminals includes: a second storage unit for storing therein the same information as the plurality of information of different objects for photographing stored in the first storage unit; a second input unit for inputting the combination ratio which has been transmitted thereto through the data transmission path; and a reproduction unit for reproducing the image of an object for photographing inputted to the first input unit in accordance with both the combination ratio inputted through the second input unit and the plurality of information of different objects for photographing stored in the second storage unit.

By adopting such a structure, it is possible to provide a system which is capable of carrying out precise coding and decoding with a small amount of data when transmitting an image of an object of coding from a transmission side to a reception side.

According to a sixth aspect of the present invention, there is provided an interactive encoding system including: an image input unit for inputting a first image of an object for photographing and a second image of an object for photographing; a storage unit for storing therein a standard wire-frame; a display device; first calculation means for obtaining a wire-frame function W1 from a first wire-frame which is fitted to an object for photographing of the first image of an object for photographing to the standard wire-frame; second calculation means for obtaining a wire-frame function W2 from the standard wire-frame to a second wire-frame which is fitted to an object for photographing of the second image of an object for photographing; first display means for displaying the first wire-frame on the display device; means for inputting a special feature point specified by an operator on the basis of the first wire-frame displayed by the first display device; extraction means for extracting a motion parameter from both the special feature point which has been inputted and the second wire-frame; third calculation means for, in response to inputting of the special feature point, calculating coded volume of the extracted motion parameter to display the coded volume on the display device; and second display means for making a product of an inverse function W1 of the wire-frame function W1 and the wire-frame function W2 a wire-frame function W3, and for producing a wire-frame which is fitted to the first image of an object for photographing in accordance with the second image of an object for photographing using both the wire-frame function W3 and the motion parameter so as to display the resultant wire-frame on the display device.

According to a seventh aspect of the present invention, there is provided a computer program product for executing an interactive processing between the computer program product and an operator, the computer program product including: a computer usable medium having computer readable program code means embodied in the medium for causing a first image of an object for photographing to be deformed in accordance with a second image of an object for photographing, the computer program product having: computer readable program code means for causing the computer to obtain a wire-frame function W1 from a first wire-frame which is fitted to an object for photographing of the first image of an object for photographing to the standard wire-frame; computer readable program code means for causing the computer to obtain a wire-frame function W2 from the standard wire-frame to a second wire-frame which is fitted to an object for photographing of the second image of an object for photographing; computer readable program code means for causing the computer to input a special feature point specified by an operator on the basis of the first wire-frame which has been displayed; computer readable program code means for causing the computer to extract a motion parameter from the special feature point thus inputted and the second wire-frame; and computer readable program code means for causing the computer to make a product of an inverse function W1 of the wire-frame function W1 and the wire-frame function W2 a wire-frame function W3, and for producing a wire-frame which is fitted to the first image of an object for photographing in accordance with the second image of an object for photographing using both the wire-frame function W3 and the motion parameter so as to display the resultant wire-frame on the display device.

By adopting such a structure, it is possible to provide an interactive model-based coding system and a program which are suitable for carrying out interactively model-based coding of an image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a functional block diagram of the analysis-synthesis portion shown in FIG. 1;

FIGS. 4A to 4C are diagrams for showing mouth shapes of a person;

FIGS. 5A and 5B are diagrams for showing images according to the prior-art synthesizing process;

FIG. 11 is a diagram for showing a pair of glasses extracted by the glasses removal processing in FIG. 10;

FIGS. 12A to 12D are diagrams for explaining a three-dimensional modeling of a pair of glasses in the glasses removal processing;

FIG. 16 is a flowchart for showing the processing at the coding system and the terminals according to the second embodiment of the present invention;

FIG. 17 is a diagram for showing a schematic configuration of a coding system according to a third embodiment of the present invention and a network system to which this coding system is applied;

FIG. 18 is a block diagram for showing a configuration of the database provided in the coding system shown in FIG. 17;

FIG. 19 is a block diagram for showing a configuration of the database provided in the coding system shown in FIG. 17;

DETAILED DESCRIPTION OF THE PREFERRED EMBODIMENTS

First to fourth embodiments of the invention will be described below with reference to the accompanying drawings.

First, the first embodiment of the invention will be explained.

Figure 1:
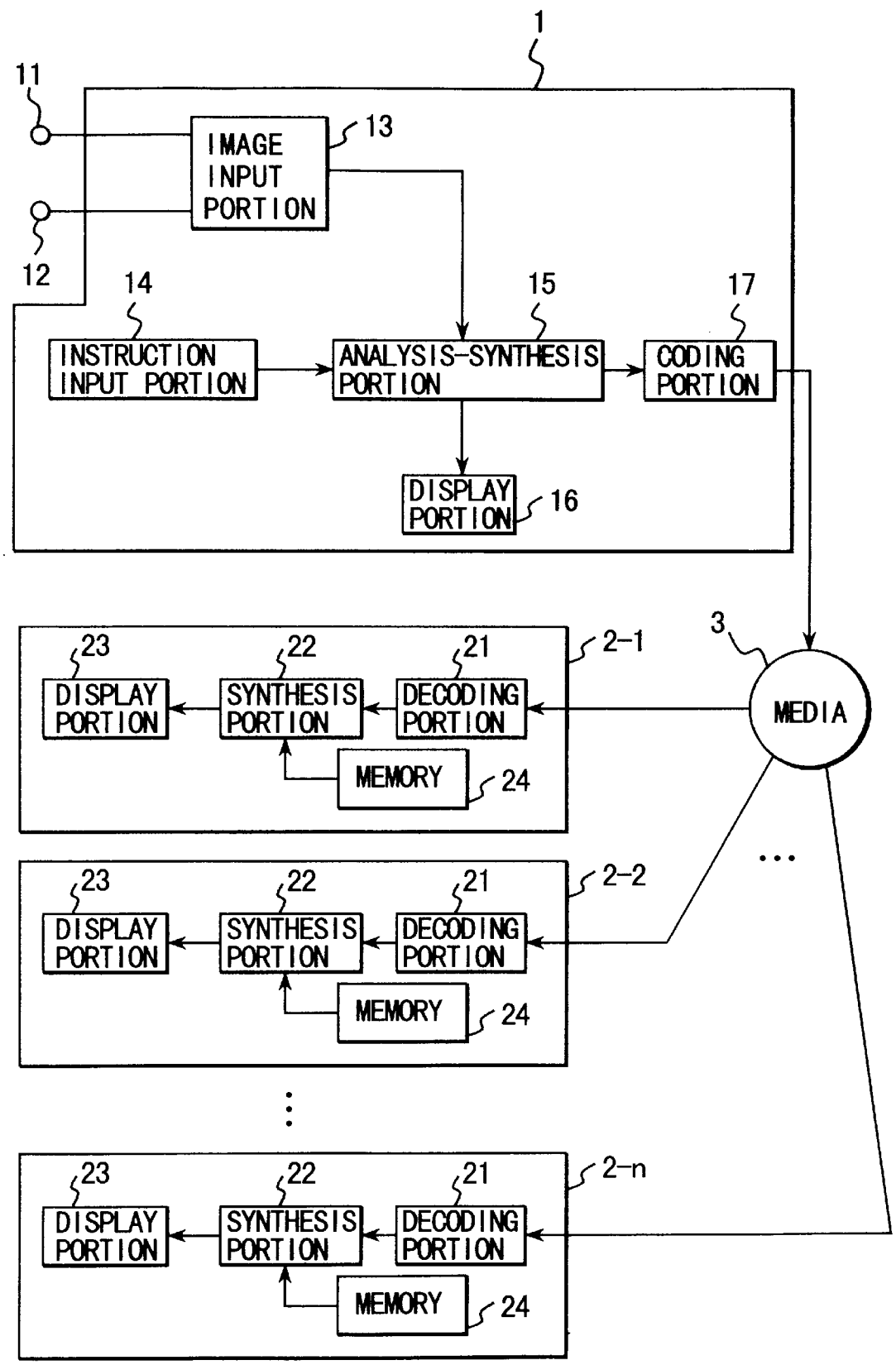
FIG. 1 is a diagram for showing a schematic configuration of a coding system according to a first embodiment of the present invention and a network system to which this coding system is applied.

FIG. 1 is a block diagram schematically showing a configuration of a network applied to a model-based coding system according to a first embodiment of the invention. A coding system 1 is connected through media 3 to a plurality of terminals 2 (2-1 to 2-n, where n is an arbitrary real number of not less than 2). The coding system 1 can transmit a coded face image to the desired terminal 2 through the media 3. The network shown in FIG. 1 is a network for realizing a TV phone, a LAN (Local Area Network) or an Internet.

The coding system 1 includes first and second input terminals 11, 12, an image input portion 13, an instruction input portion 14, an analysis-synthesis portion 15, a display portion 16 and a coding portion 17. The image input portion 13 is supplied with face image information (image sequences) through the first input terminal 11. The face image information is supplied to the analysis-synthesis portion 15. The instruction input portion 14 is supplied with an instruction of the operator from the coding system 1. This instruction is converted into a corresponding command and is applied to the analysis-synthesis portion 15. The instruction input portion 14 can be made up of a keyboard, a mouse or the like input device used by the operator for entering an instruction. The operator can enter semantic elements of the face image information constituting an object to be coded by way of the instruction input portion 14.

The semantic elements of the face image information include an face contour which is formed by adding individual characteristics to an approximate face contour determined from the edges or the like constituting the face image information. The semantic elements indicate facial elements such as eyes, nose and mustache, for playing an important role in facial expression, and the face including expression which is formed by adding special characteristics to the face motion.

The analysis-synthesis portion 15 analyzes a face image to be coded from the image input portion 13 fitting to a model wire-frame stored in a predetermined memory. Also, the face image to be coded is transformed in accordance with the change in expression or motion of the face image information of the reference image in compliance with a command sent from the instruction input portion 14 thereby to synthesize the face image information. The face image information synthesized by the analysis-synthesis portion 15 is sent to and displayed on the display portion 16. The operator can check whether the transformation has been properly performed on the basis of the face image information displayed on the display portion 16.

The coding portion 17 codes in compressed form the transformation parameters generated in the process of analysis by the analysis-synthesis portion 15 and the texture of the face image information input from the first input terminal 11. The code string thus obtained is transmitted to a desired terminal 2 through the media 3. The compressed coding of texture may use an image compression scheme such as JPEG (joint photographic coding experts group).

Each terminal 2 has a decoding portion 21, a synthesis portion 22, a display portion 23 and memory 24. The decoding portion 21 is supplied with the code string transmitted through the media 3, and decodes the code string. The image information decoded is sent to the synthesis portion 22.

The memory 24 is for storing a model wire-frame similar to the model frame held in the analysis-synthesis portion 15. The synthesis portion 22 reproduces a face image using the image information received and the model wire-frame stored in the memory 24. In other words, the synthesis portion 22 synthesizes the original face image information and reproduces a face image by the process reverse to that of the analysis-synthesis portion 15. The display portion 23 displays the face image synthesized and reproduced by the synthesis portion 22.

Now, a functional configuration of the analysis-synthesis portion 15 of the coding system 1 will be explained with reference to FIG. 2. The processing in the analysis-synthesis portion 15 is roughly divided into the analyzing process and the synthesizing process.

The analyzing process is for determining a motion parameter using the coordinates of feature points of eyes, mouth, etc. of the face image, and is divided into the fitting processing, the processing for analyzing the global motion of the face image, and the processing for analyzing the local motion relating to the facial expression. The fitting processing will be explained later.

The fitting portion 151 performs the fitting processing on the face image sent from the image input portion for the model wire-frame stored in the memory 151. This processing is for transforming each vertex of the model wire-frame to feature point on the input face image. The fitting portion 151 sends the vertex information of the wire-frame thus processed to the analysis portion 153.

The analysis portion 153 analyzes the global motion using the feature points on the wire-frame subjected to the fitting processing thereby to generate motion parameters. The motion parameters include the three rotational angles (in radians or degrees) relating to the x, y and z axes defining a three-dimensional coordinate and numerical values representing the parallel translation on an image plane (x and y axes). The motion parameters include scale factor value indicating a ratio of enlargement or reduction as necessary. These data are sent to the synthesis portion 155.

The analysis portion 154 analyzes the local motion using the wire-frame subjected to the fitting processing, and generates motion parameters representing the local motion. The motion parameters representing the local motion include a variety of parameters such as an opening rate indicating the degree the eye is open and parameters defining the mouth motion. The parameters defining the mouth motion represent a plurality of parameters including the information indicating which vowel ("a", "i", "u", "e" or "o") or, "n" or "m" is announced by the mouth motion and the information indicating the motion of each coordinate value of feature point representing the mouth shape.

The synthesis portion 155 transforms the model wire-frame stored in the memory 152 in accordance with the motion parameters sent from the analysis portions 153, 154. When the process is preset, the transformation according to the motion parameters representing the global motion or the transformation according to the motion parameters representing the local motion may be executed in advance of one or the other. The synthesis portion 155 sends an instruction to a display controller 156 to display a transformed wire-frame overlapped on an original image (the face image sent from the image input portion 13) on the display portion 16. The display controller 156 is also instructed to map or put a texture to the transformed wire-frame, and display it on the display portion 16. These instructions are issued in accordance with a command output from the command output portion 157. In response to the output command sent from the command output portion 157, the synthesis portion 155 sends out the face image (texture) to be coded, i.e., the initial still image, the wire-frame functions determined from the wire-frame fitting information and the motion parameters to the encoder 17.

The display controller 156 displays the face image and the wire-frame on the display portion 16 in accordance with the face image information and the instructions sent from the synthesis portion 155. The command output portion 157 sends out a command to the synthesis portion 155 in accordance with the operator's instructions sent from the instruction input portion.

Now, the fitting processing by the analysis-synthesis portion 15 will be explained with reference to FIG. 3.

A model wire-frame C (W00) providing a common model of wire-frame for presenting face images is prepared in advance on the basis of a most average expressionless face and is stored in a memory 152.

The synthesis portion 15 fetches the information of an image A1 containing the face image of a person A (the user himself, for example) making up a first object image input by the camera or the scanner from the first input terminal 11. Generally, the object image in the image A1 is preferably the one with a face as expressionless as possible. Actually, however, a completely expressionless face is difficult to obtain. The synthesis portion 15 is also supplied with the information of a second image B1 (reference image) containing a person B constituting a second object image from the second input terminal 12. The person B constituting the second object image may be an actor or an actress appearing in a movie or a TV program.

According to the first embodiment, the synthesis portion 15 transforms the face image of the person A constituting an object image in the following-described manner in accordance with the expression and motion of the face image of the person B constituting the reference image. Since the object image in the second image B1 is a face image of an actor or an actress in one scene of a movie or a TV program, it is a rare case that an expressionless face (reference facial expression) can be obtained. Usually, only a scene with a considerably strong facial expression is obtained.

The change in expression and motion from the model wire-frame C is used as the fitting information, which in turn is designated as Wa1 for the first object image and as Wb1 for the second object image. The fitting information from the model wire-frame W00 to the image A1, for example, is given as Wa1, and the fitting information from the image A1 to the model wire-frame W00 is given as $Wa1^{-1}$. In this way, a more strict presentation can be realized than the conventional analysis-synthesis type of model-based coding scheme in which the change in expression and motion are presented as fitting information with the images A1 and B1 as origins.

An image A2 transformed from the first image A1 is then synthesized by the texture Ta1 and the wire-frame function $Wb1 \cdot Wa1^{-1}$ of the first image A1. In this wire-frame function $Wb1 \cdot Wa1^{-1}$, the wire-frame function (fitting information) for transforming the image A1 to the model wire-frame C is $Wa1^{-1}$, and the wire-frame function (fitting information) for presenting the image B1 from the model wire-frame C is Wb1. The synthesis function therefore is given as $Wb1 \cdot Wa1^{-1}$. The wire-frame function is a function indicating the direction in which and the distance over which each of feature points (generally, several tens) on the model wire-frame C translates. The portions other than those defined by the feature points are modified and translated by expanding or compressing the whole wire-frame.

The image A2 transformed from the image A1 like the image B1 is synthesized by mapping the texture Ta1 for each small area of this wire-frame. In similar fashion, the image A3 is an image synthesized by the texture Ta1 and the wire-frame function $Wb2 \cdot Wa1^{-1}$ and represents the same facial expression and motion as the image B2.

In order to avoid the inconvenience caused when mapping the texture Ta1 to the wire-frame transformed by the wire-frame function $Wb2 \cdot Wa1^{-1}$ in converting the wire-frame of the image A1 to the model wire-frame C, the analysis-synthesis portion 15 displays an image on the display 16 and requests the operator to enter an instruction.

Normally, different persons have different shapes of eyes and mouths, and therefore some small areas (polygons) of the wire-frame may collapse. In the case where the person of the image A1 has a thin lip as shown in FIG. 4B and the person of the image B1 has a thick lip as shown in FIG. 4C, for example, the mapping of the texture Ta1 of the image A1 may fail to define the thickness of the lip. The whole lip may, therefore, appear black or skin-colored. For this reason, the analysis-synthesis portion 15 converts the lip of FIG. 4B into an ordinary lip shown in FIG. 4A, displays it on the display 16, and requests the operator to give a proper texture instruction.

Another method to avoid the collapse of the part of the wire-frame is to replace the collapsed part of the wire-frame to the standard corresponding part of the wire-frame with the standard texture.

The wire-frame that has almost collapsed or has entirely collapsed as shown in FIG. 4B is transformed into an ordinary shape as shown in FIG. 4A, and displayed on the display portion 16, requesting the operator to convert it into a state with a texture. This processing of mapping to an ordinary shape is called the generalized reverse mapping.

According to the first embodiment, when mapping between different wire-frames of the images A1 and the image B1 described above, an auxiliary normalization is performed by converting temporarily into a model wire-frame C.

In the conventional analysis-synthesis type of model-based coding scheme, the image synthesis is made as shown in FIGS. 5A and 5B. In this case, an image A11 corresponding to the image A2 in FIG. 3 is presented by the fitting information Wb1 and the texture Ta1 without using the model wire-frame C as an intermediary as in FIG. 3. Also, the image A12 corresponding to the image A3 of FIG. 3 is presented by the fitting information Wb2 and the texture Ta1. In this way, in the prior art, the images A11, A12 are produced on the assumption that the object images in the image A1 and the image B1 providing initial images are expressionless. As a result, any expression which may exist in the images A1, B1 may fail to be encoded into the right expression and motion and may lead to an unnatural transformation or texture mapping.

According to the first embodiment, in contrast, the object images in the images A1, B1 are subjected to generalized reverse mapping, and images A2, A3 and so on are produced by transforming the resulting model wire-frame. Consequently, the images A2, A3 and so on, correctly matching the expression and motion of the object images in the images B1, B2 and so on, providing reference images can be produced and coded.

Figure 6:
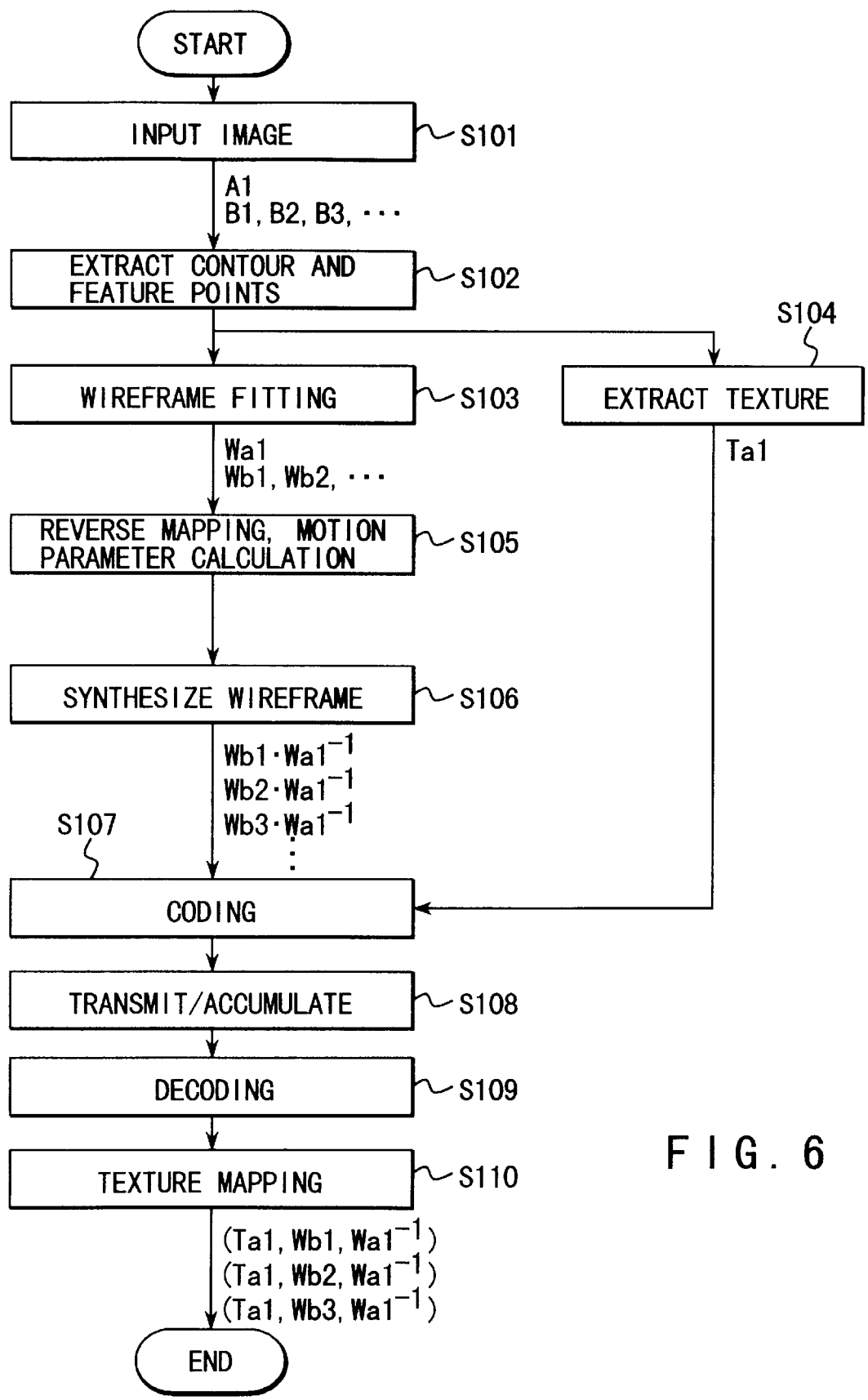
FIG. 6 is a flowchart for showing the processing at the coding system and the terminals shown in FIG. 1.

The operation of the first embodiment will be explained with reference to the face images shown in FIG. 3 and the flowchart shown in FIG. 6.

The coding system 1 is supplied with the image A1 and image sequences B1, B2, B3, and so on, from the input terminals 11, 12 (step S101). The analysis-synthesis portion 15 extracts contours and feature points (representative edge points of the eyes, mouth, nose and hairs) of the input image (step S102). Further, the wire-frame fitting and texture extraction are performed on these contours and feature points (steps S103, S104). The wire-frame fitting, as described above, is the processing for mapping between the feature points in the images A1, B1, B2, B3 and so on, and the feature points on the common wire-frame C. The texture extracted for the image A1 is called Ta1. In the case where the images A1 and B1 are input from the input terminals 11 and 12, respectively, fitting this wire-frame produces the fitting information Wa1 and Wb1.

Then, the analysis-synthesis portion 15 reversely maps the object image in the image A1 to the model wire-frame providing a common model on the basis of the wire-frame Wa1 generated in step S103. In this processing, as described above, if the small areas of the wire-frame are collapsed, a texture-mapped image is displayed on the display portion 16 to request the operator to enter an appropriate texture. Another method to avoid the collapse of the part of the wire-frame is to replace the collapsed part of the wire-frame to the standard corresponding part of the wire-frame with the standard texture. In the case where a new texture is specified by the operator or by analysis-synthesis portion 15, therefore, the texture extracted in step S104 is updated accordingly. At the same time, the analysis-synthesis portion 15 calculates motion parameters defining the global motion and the local motion. As described above, the motion parameters for global motion are five numerical values indicating the rotational angles (in radians or degrees) with respect to the x, y and z axes defining the three-dimensional coordinates, and the amount of parallel translation of the image in a plane (x and y axes). The motion parameters for local motion, on the other hand, though dependent on the coding system 1, are two including the opening rate of the eye and the opening information of the mouth in the case under consideration.

Then, a wire-frame is synthesized by the analysis-synthesis portion 15. Specifically, the wire-frame functions $Wb1 \cdot Wa1^{-1}$, $Wb2 \cdot Wa1^{-1}$, $Wb3 \cdot Wa1^{-1}$ and so on, are determined (step S106). The texture Ta1, the wire-frame functions $Wb1 \cdot Wa1^{-1}$, $Wb2 \cdot Wa1^{-1}$, $Wb3 \cdot Wa1^{-1}$ and so on, and the motion parameters are coded in the coding portion 17 (step S107). The code string thus obtained is transmitted to the desired terminal 2 through the media 3 or accumulated in the media 2 (step S108).

Figure 7:
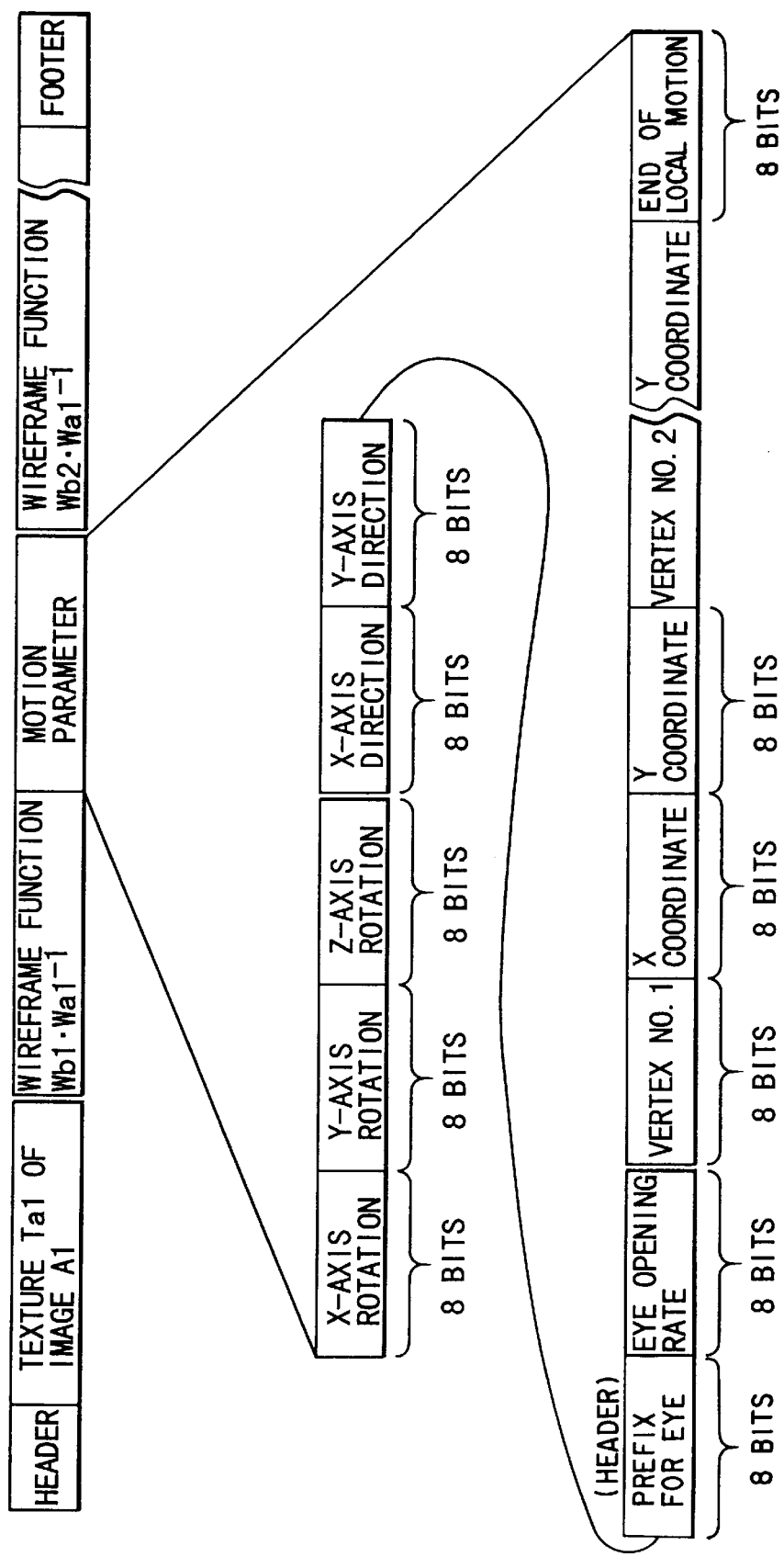
FIG. 7 is a diagram for showing the structure of data to be transmitted in the network shown in FIG. 1.

The coded texture Ta1, the wire-frame functions and the motion parameters, for example, are sent out to the media 2 as a code string shown in FIG. 7. As shown in FIG. 7, the header indicating the start of the code string is followed by a code string of the texture Ta1 of the image A1. After that, the code string of the wire-frame functions and the motion parameters corresponding to the images A2, A3 and so on, are sent, with the footer indicating the termination of the code string sent at the tail end.

Figures 8, 10:
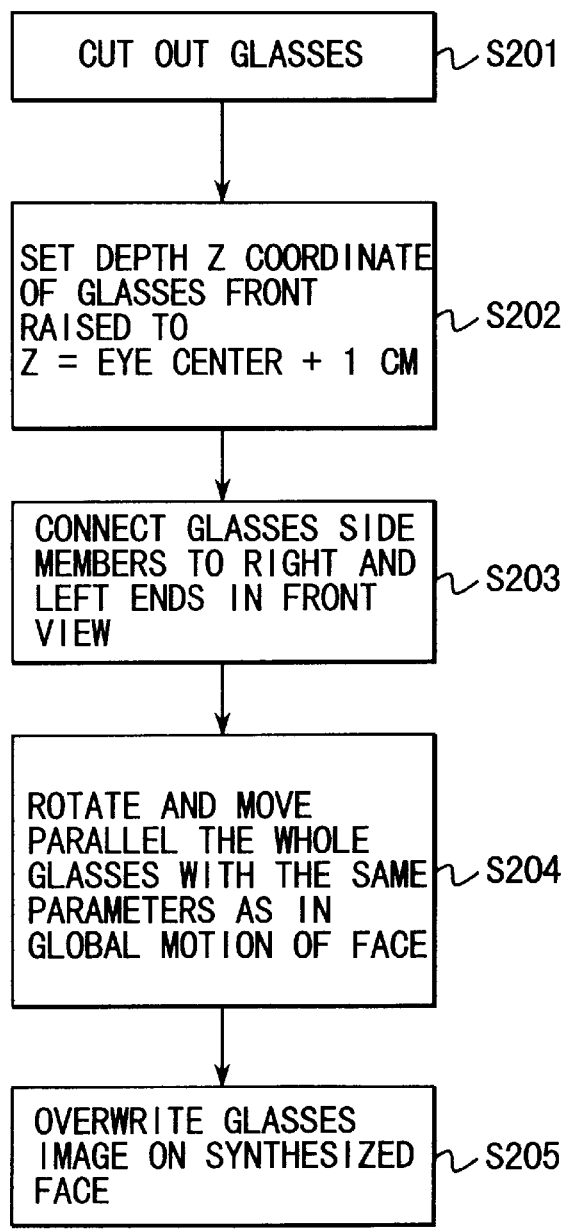
FIG. 8 is a diagram for showing one example of the features of a mouth of a person in the first embodiment.
FIG. 10 is a flowchart for explaining the glasses removal processing according to the second embodiment.

The motion parameters sent include the information indicating the global motion and the information indicating the local motion as described above. As shown in FIG. 7, the information indicating the global motion include the rotational angles of the X, Y and Z axes and the amount of translation along the directions of X axis and Y axis indicating the parallel translation, each of which is sent out in eight bits. The information indicating the local motion, on the other hand, includes the opening rate of the eye which is sent out in eight bits together with prefix eight bits, and the opening information of the mouth. The mouth opening information, as shown in FIG. 8, for example, is presented by the positional coordinates of a plurality of points representing the mouth shape. The identification number and the X and Y coordinates of each point thus are sent as an 8-bit code string, followed by suffix to indicate end of mouth information.

At the terminal 2, the texture Ta1, the wire-frame functions $Wb1 \cdot Wa1^{-1}$, $Wb2 \cdot Wa1^{-1}$, $Wb3 \cdot Wa1^{-1}$ and so on, and the motion parameters are decoded by the decoder 21 from the code string transmitted through the media 3 (step S109). Then, the synthesis portion 22 at the terminal 2 transforms the model wire-frame stored in the memory 24 in accordance with the decoded wire-frame functions and motion parameters. Further, the synthesis portion 22 performs the texture mapping using the texture Ta1 (step S110). The image sequences $(Wb1 \cdot Wa1^{-1}, Ta1)$, $(Wb2 \cdot Wa1^{-1}, Ta1)$, $(Wb3 \cdot Wa1^{-1}, Ta1)$ and so on, reproduced by this processing are displayed on the display portion 23.

An image to be coded can be accurately coded or decoded according to the expression and motion of a reference image by the processing according to the first embodiment described above. Also, even in the case where the small areas of the wire-frame are collapsed, a proper image can be reproduced at the terminal since an optimum texture can be designated interactively or replaced by the system to predetermined standard texture.

Now, a second embodiment of the invention will be explained.

According to the second embodiment, explanation will be made about the case in which an image of a rigid object (glasses) partially overlapped on a soft object (face) like an image of a person wearing a pair of glasses is subjected to model-based coding. The pair of glasses, which are not necessarily considered a rigid object, has a sufficiently high rigidity as compared with the human face and therefore is assumed to be a rigid object.

The coding system and the network to which it is applied according to the second embodiment are similar to the corresponding ones of the first embodiment shown in FIGS. 1 and 2 and therefore will not be described in detail. The analysis-synthesis portion 15, however, has the function of processing a rigid object as described later.

Two processes of the rigid object-processing function according to the second embodiment will be explained.

Figure 9A:
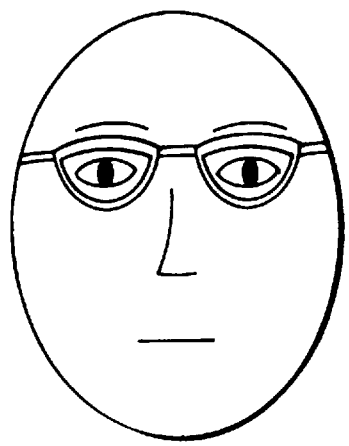
FIGS. 9A to 9F are diagrams for explaining a transformation of glasses according to the prior-art synthesizing process and a glasses removal processing in a second embodiment of the present invention.

First, explanation will be made about the first removal-mapping processing. FIG. 9A shows a face image of a person wearing glasses. When this face image is subjected to model-based coding as in the prior art, the wire-frame of the face is fitted on the whole face to perform the transformation to attach a change in facial expression. As a result, the glasses are undesirably transformed with the change in facial expression, leading to a very unnatural image. As shown in FIG. 9B schematically, for example, when the face image is changed in expression with eyes turned up, the glasses are also raised. In the case where the face image is changed in expression as shown in FIG. 9C with the eyes closed by a blink, on the other hand, an unnatural phenomenon occurs as the glasses are also shrunk vertically.

Figure 9D:
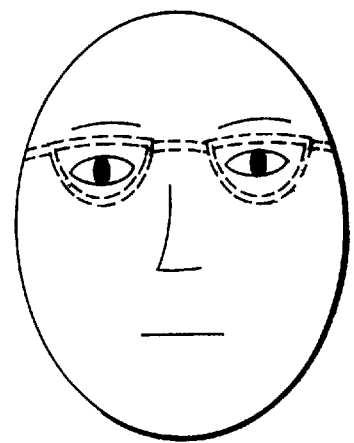
Figure 9B:
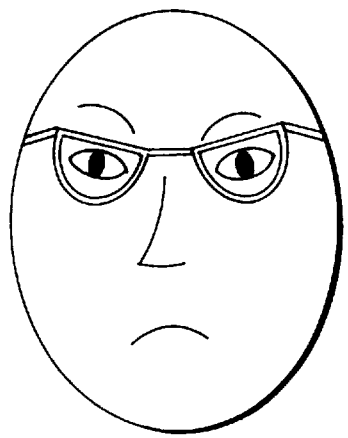
Figure 9E:
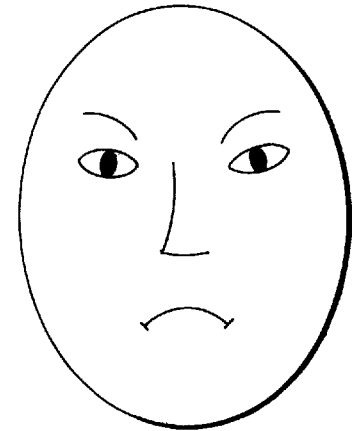
Figure 9C:
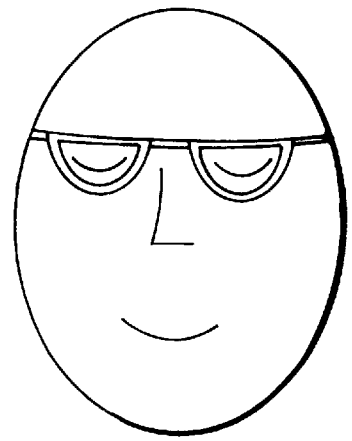
Figure 9F:
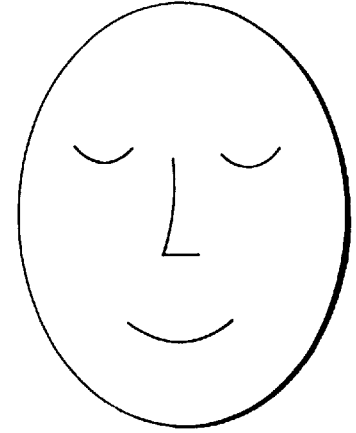

In order to accommodate these unnatural transformations of the glasses, according to the second embodiment, the glasses are removed from the input face image as shown in FIG. 9D, after which the expression is changed as shown in FIG. 9E or 9F, and then the glasses are attached in position again.

It is generally difficult to automatically perform the processing of removing the glasses from the face image. The apparently-fixed actual color and material of the frame of the glasses undergo a considerable change depending on the intensity and reflection of light rays in a face image. Also, various parts of the glasses are highlighted or other portions shadowed by the glasses. An actual image of a glasses frame which appears substantially edgeless and in different colors to human eyes is found to be very difficult to extract by edge detection.

In view of this, several representative coordinate points of the glasses frame shown by dotted lines in FIG. 9A are input by the user through the mouse to produce a shape of the glasses frame, and the area occupied by the glasses is filled with the skin color or the like of the surrounding face portion thereby to remove the glasses. The color filled in the area of the glasses may be added from the surrounding portion automatically or may be an appropriate color designated by the user. Specifically, in the configuration of FIG. 1, the analysis-synthesis portion 15 causes a face image to be displayed on the display portion 16. The operator then designates the representative coordinate points of the glasses frame and checks unrequired matters including the glasses and the shadow on the display portion 16. A correction is also performed through the input portion 13, if necessary.

Further, the glasses frame can be designated not by line but by thickness, the thickness thereof can be changed with different places, or the color of the pixels surrounding the glasses is brought from other than the neighboring portions. For example, it is effective to give an instruction to bring the skin color from the portion under the chin, beside the mouth or from the forehead, or a blackish color for shadows from an eyebrow or mustache.

Also, according as the glasses frame is filled in by skin color or the like, the originally-existent glasses frame may appear slightly remaining unremoved, and though with a slight difference in image signal level, the remainder of the glasses may appear strongly raised to human eyes. In order to prevent this inconvenience, the processing is not done linearly along the glasses frame but in random linear fashion, or the glasses frame is blurred by filter or the like afterwards thereby to effectively make the glasses frame inconspicuous.

Further, in coloring the glasses, a single skin color is not applied continuously for a given portion, but an actual area of a skin is cut out and transplanted to produce a more natural image.

The flow of the first removal-mapping processing described above will be explained with reference to FIG. 10. The removal processing is performed by the analysis-synthesis portion 15, and the mapping processing by the synthesis portion 22.

First, the analysis-synthesis portion 15 performs the processing of removing the glasses portion from the face image containing the glasses (step S201). After that, the Z coordinate indicating the depth of the front portion of the glasses is set to $$Z=(eye\ center)+1\ cm$$

in step S202. The side members of the glasses are set to connect to the right and left ends of the face front (step S203). The whole glasses cut out are rotated and translated parallel in accordance with the parameters indicating the global motion of the face (step S204).

The synthesis portion 22 overwrites the glasses image portion on the face image synthesized (step S205). The glasses image portion other than the glasses portion, as shown in FIG. 11, is set to black, for example. The synthesis portion 22 leaves the black portion unprocessed, and overwrites only the non-black portions.

Now, explanation will be made about the processing of transforming the glasses frame in accordance with the rotation of the head.

FIG. 12A is a diagram showing an example of an initial face image wearing a pair of glasses. The face and the glasses are a three-dimensional structure having depth information. Normally, the glasses, as shown in the side view of the face image of FIG. 12B, are located at a distance from the face. The analysis-synthesis portion 15 produces this three-dimensional model from the face image. The image of FIG. 12B, however, is not necessarily input by the operator, the only necessity being an indication that the glasses frame is located at a distance from the face when coordinates of the glasses frame are set. It is preferable that the coordinates of the glasses frame are preset.

An image of the face wearing the glasses is modeled as described above. After the processing for removing the glasses performed in the manner described above, assume that the face is changed in direction, i.e., the head is rotated (horizontally or vertically). Then, the interval between the eyes is narrowed or the line connecting the eyes is inclined on the image. In such a case, the glasses frame is also required to be deformed from the front view in accordance with the head rotation. FIG. 12C shows a face image with the head rotated laterally, and FIG. 12D a face image with the head rotated diagonally downward. When these face images are viewed from the front, the glasses frame appears shrunk laterally or both laterally and vertically, respectively. An image with a shrunk glasses frame, therefore, is required to be produced. An image with a shrunk glasses frame can be produced by any of the following methods.

(1) A three-dimensionally modeled frame is rotated in the same direction and at the same angle as the head to produce a rotated glasses frame.

(2) A simple method is to determine the distance Wa between the right and left eyes in the initial image of FIG. 12A so that with the lateral rotation of the head, the distance Wc between the eyes of the face image of FIG. 12C is determined, while with the diagonal rotation of the head, the distance Wd in the face image of FIG. 12D is determined. As a result, the lateral and vertical sizes of the glasses frame image extracted from the initial image of FIG. 12A are reduced by the ratio of Wa/Wc or Wa/Wd.

(3) A more interactive method consists in entering the right and left edge points of the glasses frame in FIG. 12D and reducing the image in such a manner that the end points of the glasses frame extracted from the initial face image of FIG. 12A are located within the distance between the right and left end points entered.

(4) In the case where the head is rotated in a plurality of directions including vertical and lateral directions as shown in FIG. 12D, a three-dimensional model is also rotated to determine the inclination and the reduction ratio of the glasses frame image from the distance between the eyes and the positions of the eyes.

In the methods (2) and (3) described above, though a three-dimensional model is assumed, the glasses frame image is reduced by the processing in a two-dimensional plane.

Figure 13:
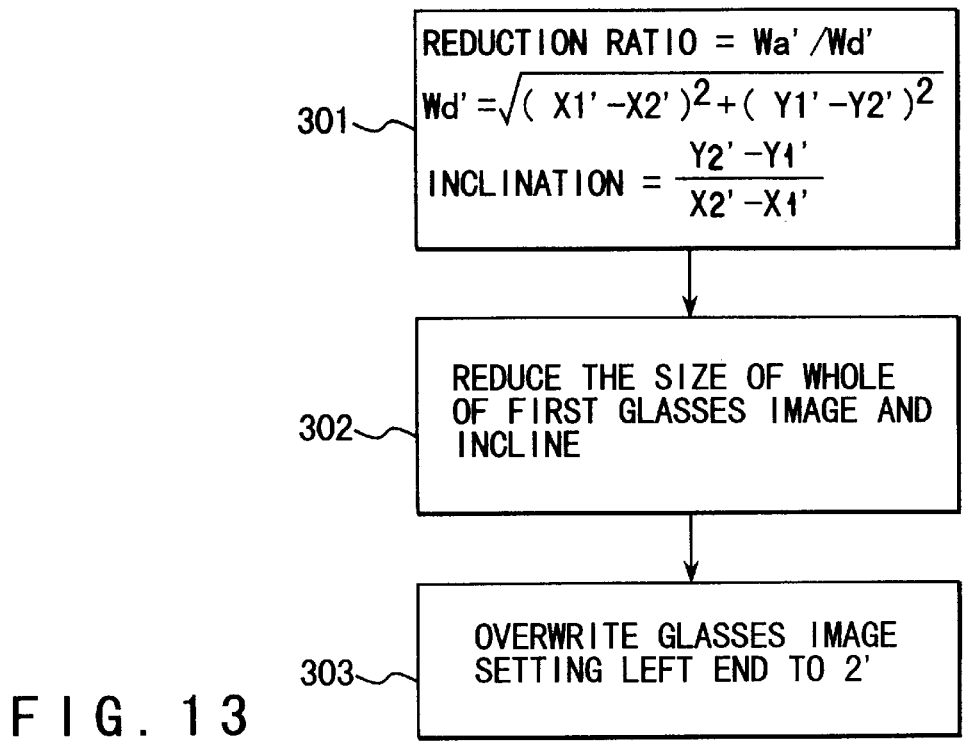
FIG. 13 is a flowchart for explaining the glasses removal processing using the three-dimensional model of the glasses.

The transformation using a modeled frame of a pair of glasses corresponding to the method (1) above will be explained with reference to the flowchart of FIG. 13.

Figure 14A:
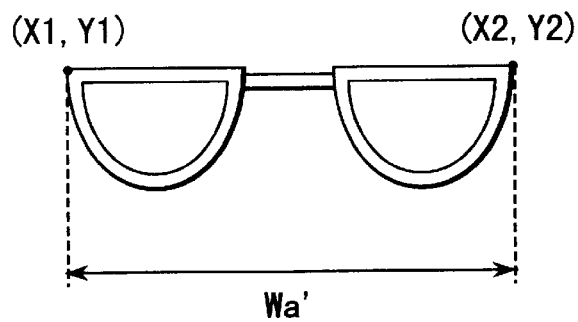
FIGS. 14A and 14B are diagrams for explaining the glasses removal processing in FIG. 13.
Figure 14B:
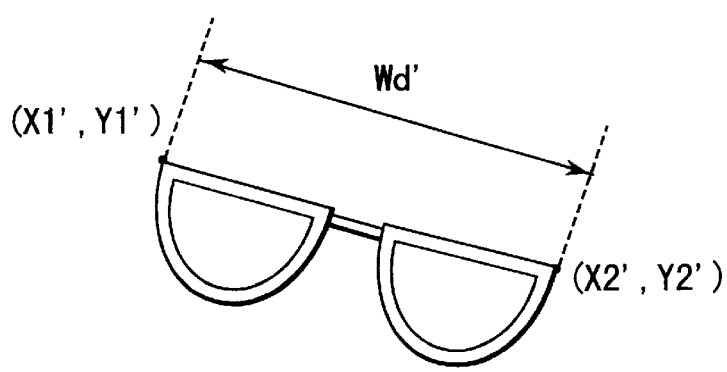

The analysis-synthesis portion 15 calculates the inclination and the reduction ratio from the width Wa' of the glasses frame in front view and the width Wd' of the frame with the head rotated in FIGS. 14A and 14B (step S301), where Wd' is determined from the X and Y coordinates of the right and left ends of the glasses frame in front view and the X and Y coordinates of the right and left ends of the glasses frame with the head rotated. After that, the modeled glasses frame in front view is transformed in accordance with the calculated inclination and the reduction ratio.

The transformed frame of glasses is overwritten on a reproduced image like in step S205 described above by the synthesis portion 22 (step S303). In this case, the glasses frame is overwritten in such a manner that predetermined positioning reference points are overlapped, for example, in such a manner that the coordinate (X1, Y1) is overlapped on the coordinate (X1', Y1'). The coordinate (X1, Y1) can be determined at a distance from the feature point of eye left end. The coordinate (X1', Y1') can be determined at a distance from the feature point of eye left end on the transformed wire-frame.

Figure 15:
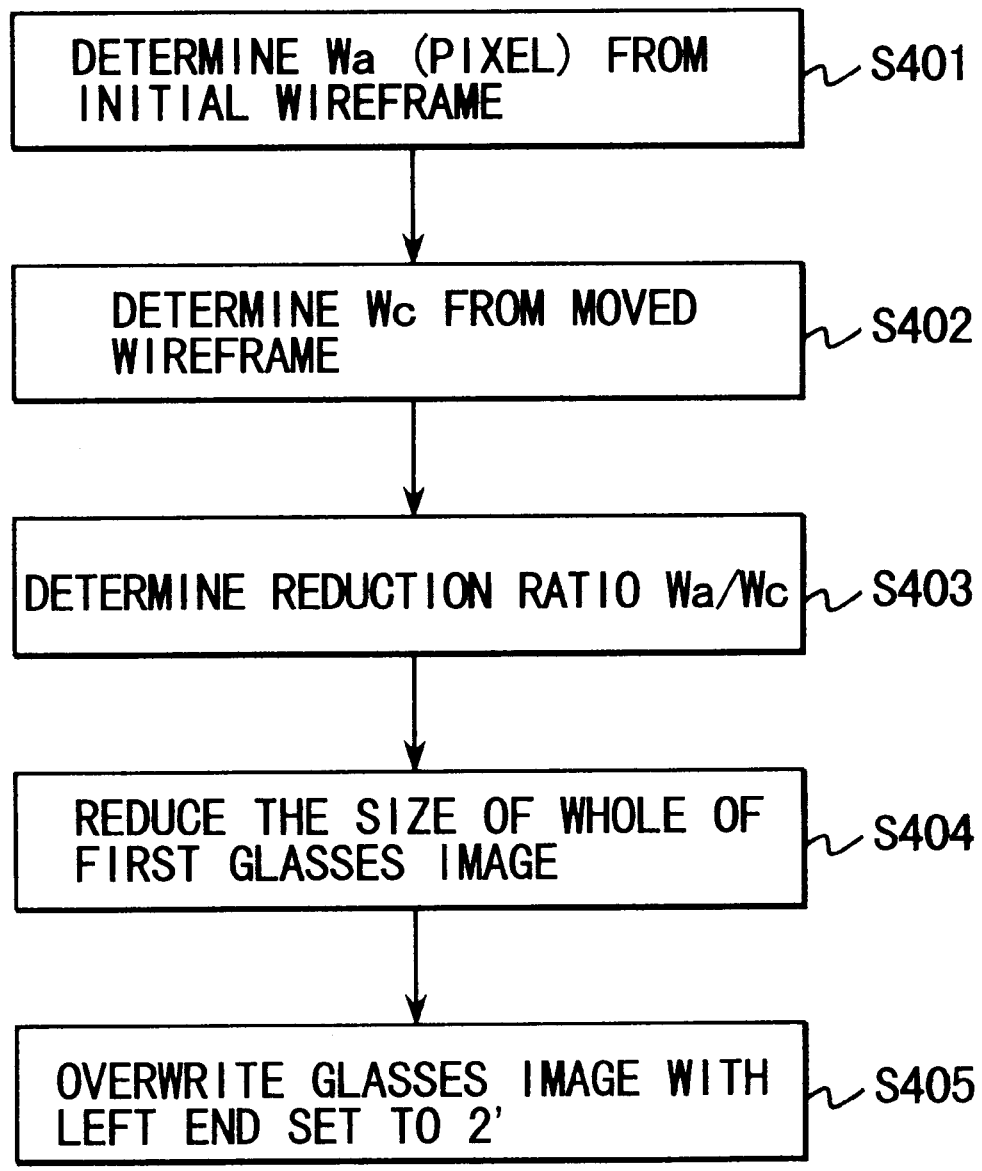
FIG. 15 is a flowchart for showing a simple method of the glasses removal processing.

Now, the transformation processing corresponding to the method (2) described above will be explained with reference to the flowchart of FIG. 15.

The analysis-synthesis portion 15 calculates Wa shown in FIG. 12A from the initial wire-frame (step S401), and Wd shown in FIG. 12D is determined from the translated wire-frame (step S402). Normally, the wire-frame of a face includes the end points of the eyes. The positional coordinates of the farthest ends 11, 12 of the eyes before and after translation are determined by the time of the fitting processing. The value Wa can therefore be easily obtained.

Then, the reduction ratio is determined from Wa and Wd. In accordance with this reduction ratio, the glasses frame is reduced in size (steps S403, S404). After that, the synthesis portion 22, like step S303, performs the overwriting processing in such a manner that predetermined positioning reference points are overlapped one on the other.

Now, the operation of the second embodiment will be explained with reference to the flowchart shown in FIG. 16.

In a coding system, when image information of the face image of a person wearing a pair of glasses as shown in FIG. 9A is applied from the input terminal 11 (step S501), the contour and the feature points of the image are extracted (step S502). Further, the wire-frame fitting operation and extraction of texture are performed on these contour and feature points (steps S503, S504).

After texture extraction, the glasses are retranslated as described above (step S505). This processing of removing the glasses is performed interactively. In other words, the texture of the face image input is displayed on the display portion 16. Several representative coordinate points of the glasses frame with arbitrary intervals are designated by the input portion 13 on the face image thus displayed. Further, the skin color of the portions hidden behind the glasses frame and the highlighted areas of the lenses are designated. According to the designation, the texture of the face image with the glasses removed and the coordinates of the frame and the shadow (called the parameters of the glasses) are obtained.

Then, the texture of the face image and the parameters of the glasses with the glasses removed as obtained in step S505 and the wire-frame (transformation parameters) generated in step S503 are coded (by model-based coding) (step S506). The glasses frame is transformed by use of any one of the above-described methods for coding the wire-frame. The code string thus obtained is transmitted to the desired terminal 2 through the media 3 (step S507).

The glasses information in addition to the code string of FIG. 7 are attached to the code string thus transmitted.

At the terminal 2, on the other hand, the texture, the glasses parameters and the wire-frame are decoded by the decoding portion 21 from the code string transmitted or accumulated by the media 3 (step S508), the texture mapping is performed by the synthesis portion 22 to generate an image sequence (step S509), and further the glasses are added (overwritten) (step S510).

Though not shown in the flowchart of FIG. 16, the coding system 1 performs the texture mapping and addition of glasses in a similar fashion as in steps S509 to 510, and the image sequence thus obtained is displayed on the display portion 16.

As a result of the above-mentioned processing, an object to be coded having an object image with a rigid object partially overlapped on a soft object can be subjected to model-based coding without unnatural transformation of the rigid object. This image is transmitted to the desired terminal and reproduced.

A third embodiment of the present invention will be explained next.

A coding system relating to the third embodiment and a network to which terminals for reproducing a picture coded by this coding system are applied are show in FIG. 17. A coding system 1' and terminals 2' (2'-1 to 2'-n) shown in FIG. 17 basically have similar structures to those of the coding system 1 and the terminals 2 (2-1 to 2-n) respectively in the first embodiment described above.

However, the coding system 1' and each of the terminals 2' in the third embodiment are further provided with databases 18 and 25 respectively. The structures of the databases 18 and 25 are shown in FIGS. 18 and 19 respectively.

As shown in FIG. 18, the database 18 includes a management portion 181 for controlling the whole of the database 18. The management portion 181 outputs a wire-frame and a texture stored in a basic information portion 182 to the analysis-synthesis portion 15 as the occasion demands. The basic information portion 182 stores wire-frames and textures for showing ten faces of prominent features respectively for five elements of contours of the face, eyes, eyebrows, a nose and a mouth, as face information F1 (W1, T1) to F10 (W10, T10).

The database 25 includes a management portion 251 for controlling the whole of the database 25 as shown in FIG. 19. The management portion 251 outputs a wire-frame and a texture stored in a basic information portion 252 and an extended information portion 253 respectively as the occasion demands. The basic information portion 252 stores wire-frames and textures which are the same as the information stored in the basic information portion 182 of the database 18, as face information F1 (W1, T1) to F10 (W10, T10). The extended information portion 253 stores wire-frames and textures sent from the coding system 1' other than the face information F1 to F10, as face information F11, F12, - - - .

The analysis-synthesis portion 15 can perform the processing explained below in addition to the above-described processing in the first embodiment. However, the processing described below are carried out when specific conditions to be described later are it satisfied.

Figure 3:
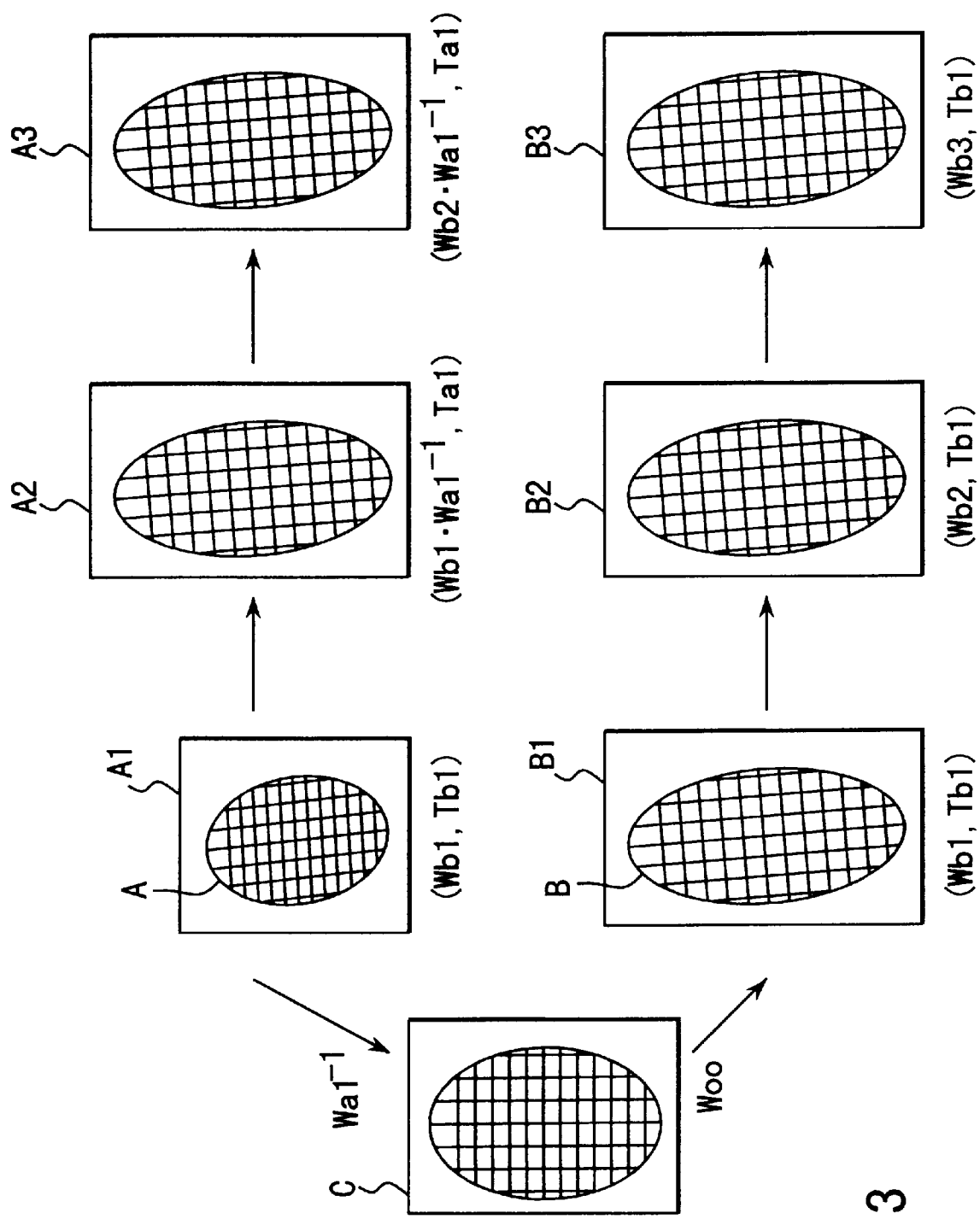
FIG. 3 is a diagram for explaining the synthesizing process according to the analysis-synthesis portion shown in FIG. 2.

At first, the analysis-synthesis portion 15 obtains ratios of the face information F1 and F1 to F10 stored in the database 18 to be combined together for reproducing a wire-frame of a face image to be transformed, that is, an initial face image A1 (reference FIG. 3). For example, when the wire-frame of A1 is Fa1, the following ratios are obtained:

$$Fa1 = F1 \times 0.3 + F2 \times 0.2 +, ---, +F10 \times 0.1.$$

For the texture of the face image A1, ratios of the face information F1 to F10 are obtained in a similar manner.

The analysis-synthesis portion 15 further obtains ratios of the face information for the wire-frame and the texture individually for the five elements of the contours of the face, the eyes, the mouth, the eyebrows and the nose, in addition to the ratios of the face information for the wire-frame and the texture relating to the face image A1. In this case, the ratios obtained for the five elements may be different from the ratios obtained for the face image.

The ratios thus obtained are sent to a desired terminal through the medium 3 after having been coded by the coding portion 17.

The face image (initial face image) A1 encoded by the above-described processing is transmitted to a desired destination terminal 2' in the data string structured by the address of the destination terminal 2', the texture and wire-frame information of the face image and the texture and wire-frame information for each of the five elements. Accordingly, it is possible to reduce substantially the amount of data to be transmitted as compared with the conventional case where the texture of the face image (initial face image) A1 is transmitted sequentially for each polygon and the fitting information is transmitted sequentially for each feature point.

Figure 20:
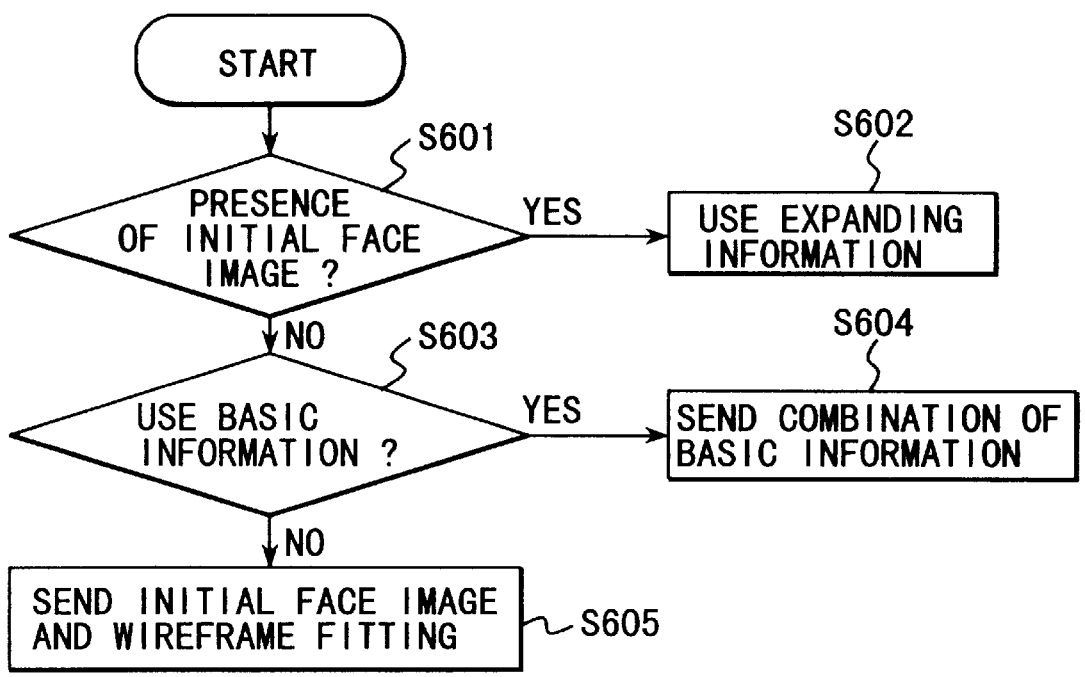
FIG. 20 is a flowchart for showing a processing of determining a transmission data structure in the coding system shown in FIG. 17.

Next, a data format decision processing at the time of transmitting the face image (initial face image) A1 to a desired terminal 2' in the coding system 1' will be explained below with reference to a flowchart shown in FIG. 20.

At first, the analysis-synthesis portion 15 of the coding system 1' determines whether or not the wire-frame and the texture of the face image (initial face image) have already been stored in the extensive information portion 253 at the terminal 2 of the transmission destination (step S601). This decision is made on the basis of whether or not the wire-frame and the texture of the face image A1 have ever been transmitted to the terminal 2' of the transmission destination by referring to the address of this terminal 2'. If it is determined that the wire-frame and the texture of the face image A1 have already been transmitted to the extensive information portion 253, then the analysis-synthesis portion 15 informs to the terminal 2' through the coding portion 17 and the medium 3 that it is possible to apply the wire-frame and the texture of the face image A1 stored in the extensive information portion 253 (step S602). If it is determined that the wire-frame and the texture of the face image A1 have not been transmitted to the extensive information portion 253 of the terminal 2' (step S602, NO), the analysis-synthesis portion 15 determines whether or not to transmit the wire-frame and the texture of the face image A1 on the basis of a combination of the face information F1 to F10 stored in the basic information portion 252 of the terminal 2' (step S604). At this time, the analysis-synthesis portion 15 requests the operator for an input of an instruction by displaying a predetermined selective screen.

When an instruction of the operator is an instruction for combining the face information F1 to F10 of the basic information portion 182 (252) (step S603, YES), the analysis-synthesis portion 15 reads the face information F1 to F10 stored in the database 18 and carries out the processing as described above. With this operation, the texture and wire-frame information of the face image A1 and the texture and wire-frame information for each of the five elements, using the face information F1 to F10 respectively, are coded by the coding portion 17 and are then transmitted as a data string to the desired terminal 2' through the medium 3 (step S604).

When an instruction of the operator does not instruct a combination of the face information F1 to F10 (step S603, NO), the analysis-synthesis portion 15 sequentially sends the texture and the fitting information of the wire-frame for the face image A1 to the coding portion 17 for sending these information to the terminal 2'. The texture and the fitting information of the wire-frame for the face image A1 are sequentially coded by the coding portion 17 and are transmitted to the desired terminal 2' through the medium 3.

With the above-described processing, both the texture and the wire-frame information of the face image which is an initial face image are transmitted to the desired terminal in an appropriate format. Particularly in the data format in the steps S602 and S604, it becomes possible to transmit the information with a significantly smaller amount of data than the amount of data conventionally required. This leads to an improved processing efficiency of the coding system 1', the terminal 2' and the network as a whole.

The decision processing in the step S604 may not be performed on the basis of an instruction from the operator. Instead, it is also possible to structure the coding system 1' such that an enquiry is made as to whether or not the remaining volume of the memory of the extended information portion 253 at the terminal 2' of the data transmission destination is at least a predetermined level and a decision is made based on a result of this enquiry.

A fourth embodiment of the present invention will be explained next.

The fourth embodiment is an interactive model-based coding system which achieves the coding system 1 applied in the first embodiment more interactively. This interactive model-based coding system has a similar structure to that of the coding system 1 used in the first embodiment (reference FIG. 1), and therefore includes the analysis-synthesis portion having the functional structure shown in FIG. 2. Since the structure of the coding system 1 has already been explained above in the first embodiment, the interactive processing of the interactive model-based coding system will be explained below.

Figure 21:
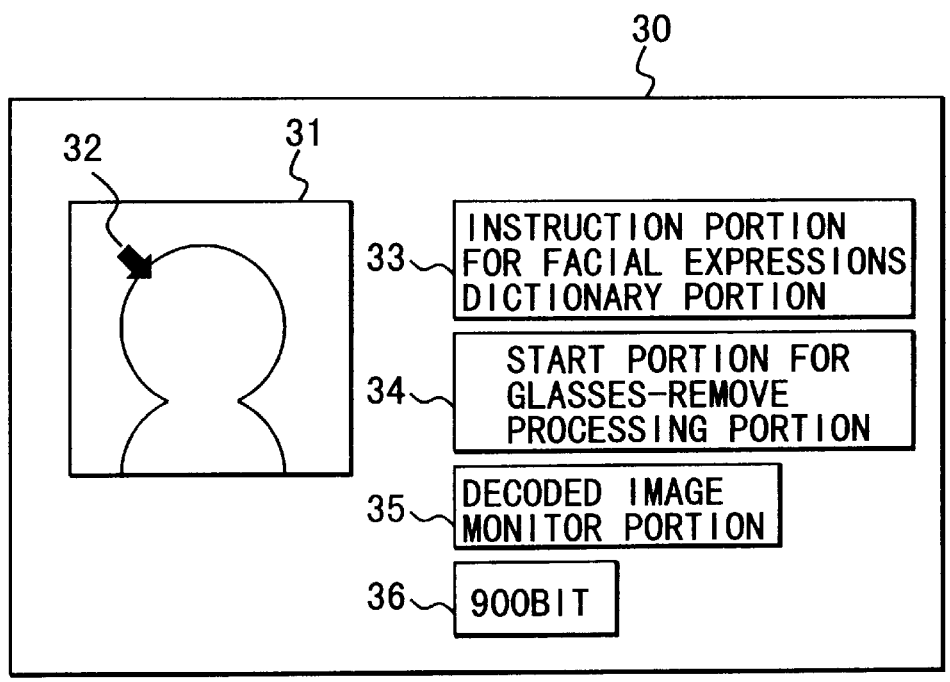
FIG. 21 is a diagram for showing one example of a picture displayed on the display of an interactive model-based coding system relating to a fourth embodiment of the present invention.

FIG. 21 is a diagram for showing an example of an operation screen of the interactive model-based coding system. As shown in this figure, an operation screen 30 is provided with an image display area 31, a display dictionary instruction portion 33, a glasses removal processing start instruction portion 34, a decoded image monitor instruction portion 35, and a coded volume display 36. A cursor 32 displayed in the image display area 31 is for displaying the feature points or the like of the instruction input by the user.

The image display area 31 is an area for displaying an image subjected to a coding (initial face image), and the display dictionary instruction portion 33 is an area for instructing an expression dictionary display for fitting an expression to the image to be subjected to a coding displayed in the image display area 31, that is, an area for selecting transformation parameters of a motion and an expression necessary for the model-based coding from certain image sequences or from a required motion/expression parameter set and for instructing a display of the wire-frame. The glasses removal processing start instruction portion 34 is an area for instructing a start of the glasses removal processing on a face image displayed in the image display area 31. The decoded image monitor portion 35 is an area for instructing a monitor display of a decoded image obtained by a local decoding of a result of the model-based coding. The coded volume display 36 displays the volume of a coding generated in the coding portion and indicates to the user that there is a limit to the volume of the coding generated by the transformation parameters. The operation screen 30 may also be provided with such instruction portions as a transmission/storage instruction portion and an electronic mail transmission instruction portion depending on the needs, in addition to those shown in FIG. 21.

The image display area 31 displays a face image with a larger number of pixels than the number of pixels of the input face image. This makes it possible to minimize a deviation in the input due to a fluctuation of the operator's hand in inputting an instruction point and an oscillation of the mouth.

By using an integrated interactive model-based coding system equipped with the above-described operation screen 30, it becomes possible to perform interactively and smoothly the model-based coding explained in the first to the fourth embodiments.

The processing operation when each of the above-described display areas has been clicked by the input portion such as the mouth will be explained below.

Figure 22:
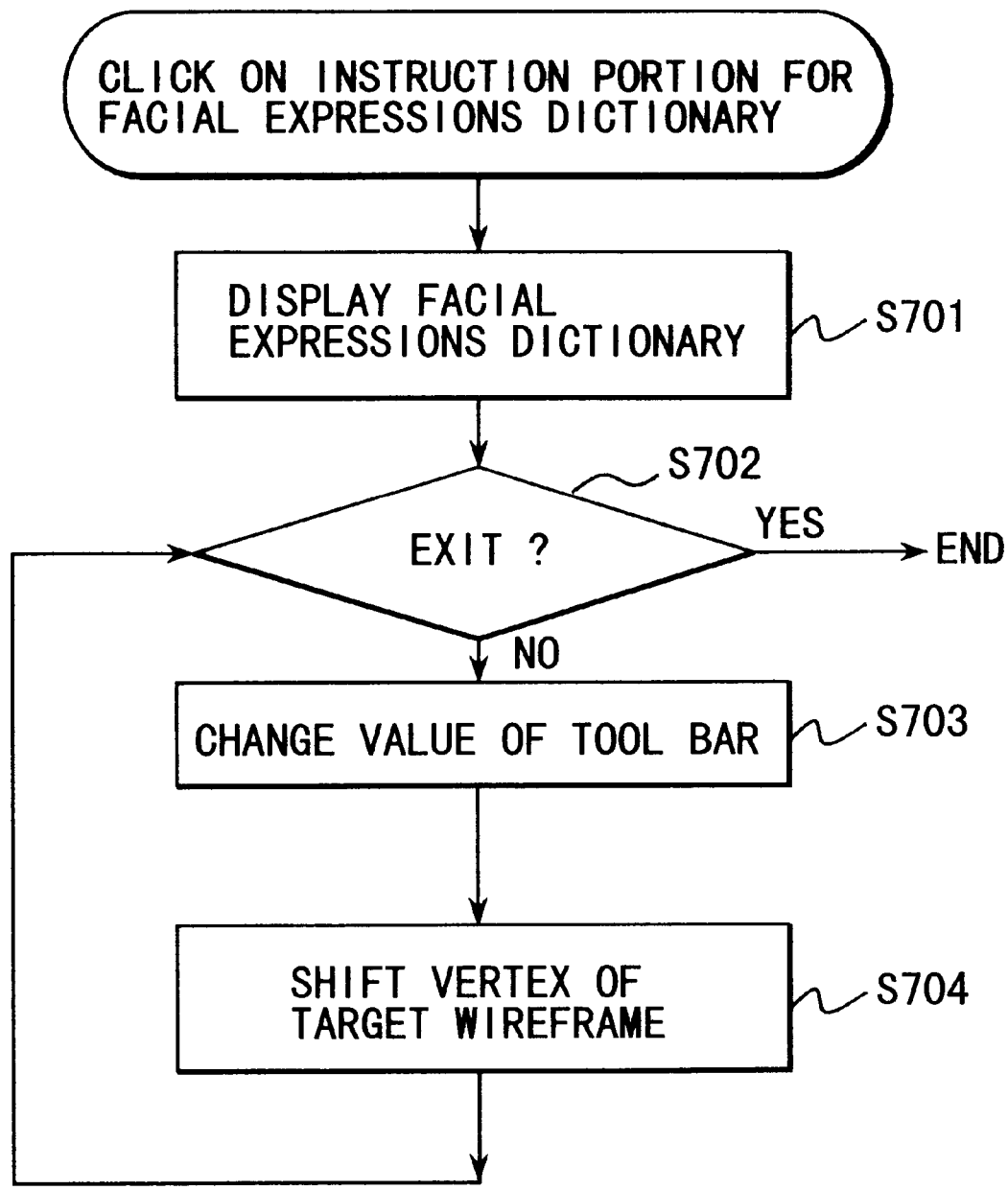
FIG. 22 is a flowchart for showing an operation of the interactive model-based coding system when an expression dictionary display instruction portion shown in FIG. 21 has been clicked by the operator.
Figures 23, 24:
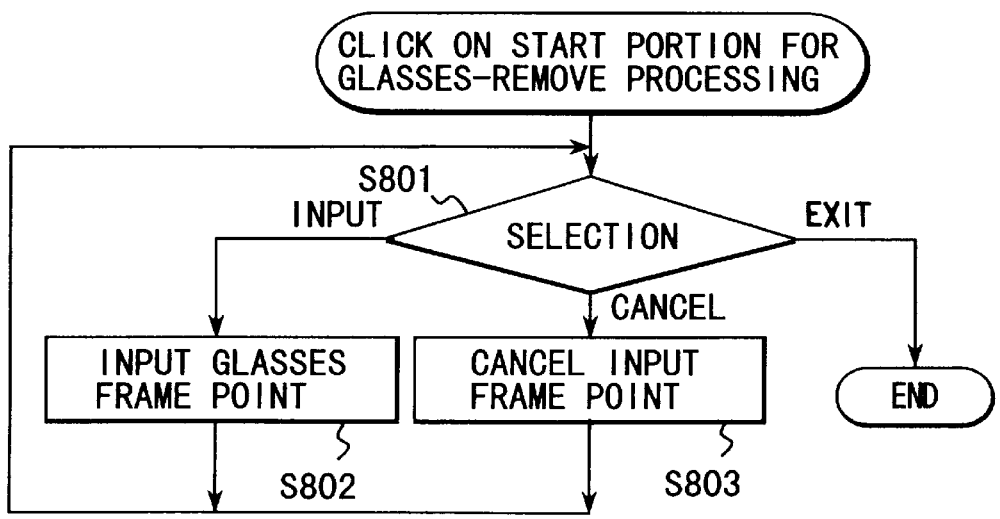
FIG. 23 is a diagram for showing one example of an expression dictionary table displayed in window in the operation shown in FIG. 22.
FIG. 24 is a flowchart for showing an operation of the interactive model-based coding system when a glasses removal starting portion shown in FIG. 21 has been clicked by the operator.

The processing in the case where the expression dictionary display instruction portion 33 has been clicked will be explained first, with reference to a flowchart shown in FIG. 22. When the expression dictionary display instruction portion 33 has been clicked, an expression dictionary table shown in FIG. 23 is window displayed (step S701). When the end button of the display dictionary table has been clicked by the operator after the display of the display dictionary table in the step S701 (step S702, YES), the display screen of the display 16 returns to the screen shown in FIG. 21. When the expression dictionary instruction portion 33 is clicked next, a predetermined processing ends.

When a rhombus shown in the table of the expression dictionary has been dragged and dropped by the operator, the value of the tool bar changes according to this instruction (step S703). In accordance with this changed value, the operator can move and assign the top of the wire-frame displayed in the image display area 31 (step S704). By this operation, the operator can assign the expression of a smile 0% and the expression of smile 100%, for example. Thereafter, the control of the interactive model-based coding system returns to the step S702.

With the above-described processing, it is possible to assign interactively the expression of the face image which is an initial face image.

Next, the processing in the case where the glasses removal processing start instruction portion 34 has been clicked will be explained with reference to a flowchart shown in FIG. 24. Since the glasses removal processing has been described in detail in the second embodiment, the explanation of the processing relating to only the glasses removal will be omitted, and description will be made of only the processing interactive with the operator.

When the glasses removal processing start instruction portion 34 has been clicked by the operator, a selective screen for the operator to instruct an input, a cancel or an end of the glasses frame point is window displayed in the display 16 of the interactive model-based coding system.

When the input has been selected by the operator (step S801, input), the control of the interactive model-based coding system shifts to a status of accepting the input of the glasses frame point (step S802). Thus, the operator can instruct the glasses frame point of the wire-frame displayed in the image display area 31 with an input portion such as the mouse. Thereafter, the assigned wire-frame is removed as the glasses frame (reference the second embodiment).

When the operator has selected a cancel (step S801, cancel), the control of the interactive model-based coding system shifts to a status of accepting the cancel of the glasses frame point input previously (step S803). Thus, the operator can cancel the glasses frame point instructed previously, on the wire-frame displayed in the image display area 31.

When the operator has selected the end on the selective screen (step S801, end), the processing relating to the start of the glasses removal processing ends.

With the above-described processing, an input of the glasses frame point for executing the glasses removal processing is carried out interactively.

Figure 25:
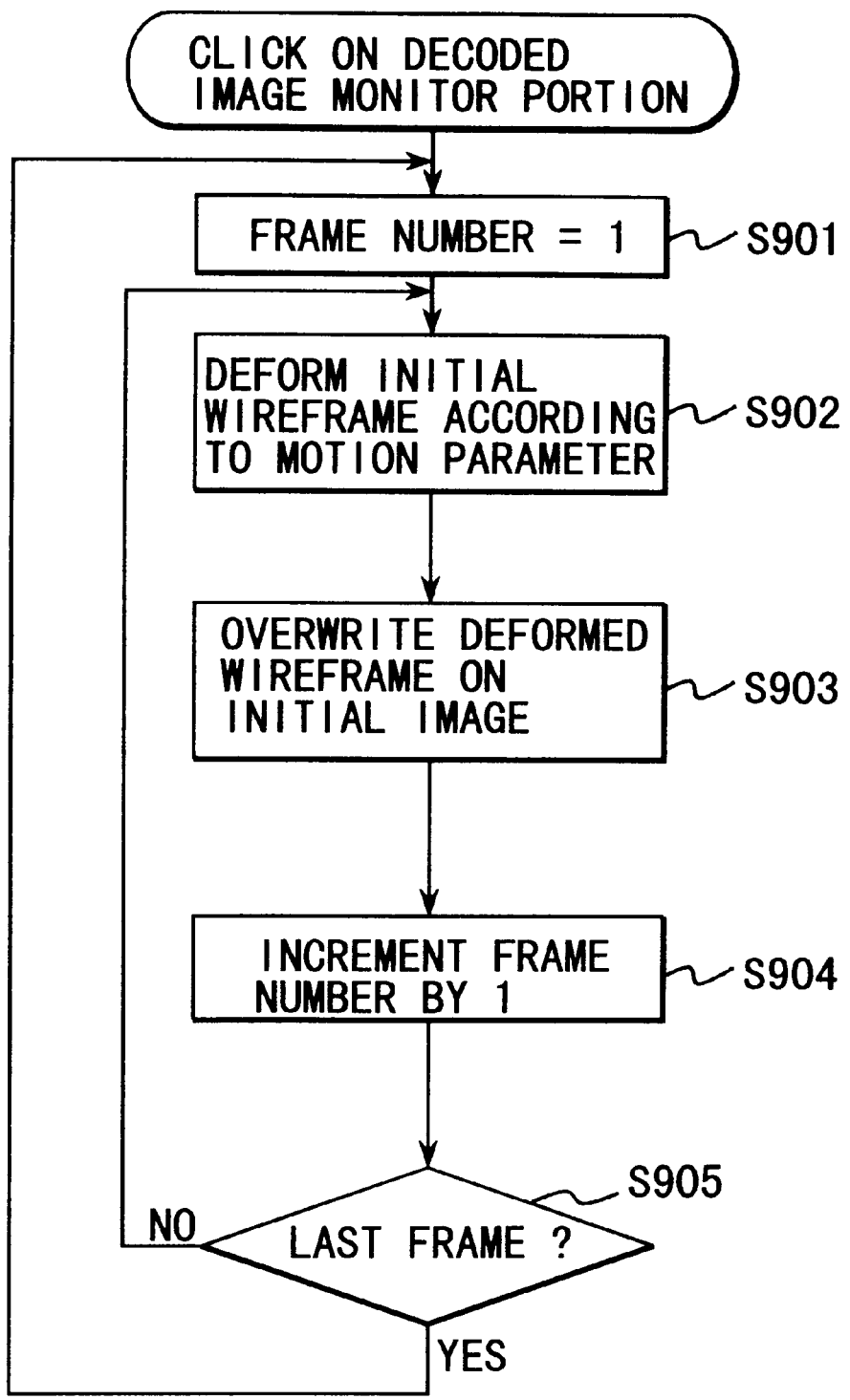
FIG. 25 is a flowchart for showing an operation of the interactive model-based coding system when a decoded picture monitoring portion shown in FIG. 21 has been clicked by the operator.

Next, the processing in the case where the decoded image monitor instruction portion 35 has been clicked by the operator will be explained with reference to a flowchart shown in FIG. 25.

When the decoded image monitor instruction portion 25 has been clicked, the control of the interactive model-based coding system shifts to a status of a reproduction processing of the synthesized wire-frame. In this reproduction processing of the synthesized wire-frame, at first the frame number is set to 1, for example, the face image A2 in FIG. 3 (step S901). Then, the initial face image displayed in the image display area 31 is transformed to the wire-frame of the face image A2 and this is displayed (steps S902 and S903). In this case, the frame number refers to an identification number allotted sequentially to input image sequences.

Thereafter, the frame number is incremented by one (1) (step S904). When the frame number incremented by one is not the last frame number (step S905, NO), the processing returns to the processing in the step S902 again. The processing in the steps S902 to S904 are repeated until the frame number becomes the last frame number. The last frame number is the number for showing the last image of the input image sequences.

When the frame number is the last frame number (step S905, YES), the processing returns to the processing in the step S901, and the reproduction of the synthesized wire-frame is carried out again. These processing are continued to be executed until a predetermined key such as the escape key has been depressed.

With the above-described processing, the operator can confirm the synthesized wire-frame. In the above explanation, the system is the one for overwriting the wire-frame on the original image. However, the system may also be structured such that the texture is mapped on this wire-frame so as to display a decoded image having a harmony as an image.

The display of the coded volume in the coded volume calculation portion 36 will be explained below.

In the interactive model-based coding system, the volume of parameters is calculated according to an input of the feature points to the image display area 31. Accordingly, the coded volume to be displayed in the coded volume calculation portion 36 is displayed in real time according to the input of the feature points.

One example of the breakdown of the coded volume is shown below.

Initial face image: 512×480 pixels 700 KB
   After JPEG compression Approx. 20 KB
Wire-frame (fitting information): 70 points×(X, Y) 1,120 B
Global motion: 5×8=40 B
Local motion: Average 10×24 240 B In this case, the local motion is increased or decreased by the instruction of the operator, as explained in the first embodiment. In other words, the coded volume changes depending on the number (type) to be assigned as the local motion.

Total number of bits of the first frame=20 KB +1,120+40
Total number of bits of the n-th frame $$
\begin{aligned}
= \ & 20 \text{ KB} + 1{,}120 + 40 \\
& + \text{local motion } 1 \times 24 \\
& + \text{local motion } 2 \times 24 \\
& + \text{local motion } 3 \times 24 \\
& \cdots \\
& + \text{local motion } n \times 24
\end{aligned}
$$

As a display unit of the coded volume, "bit per second" is available. This unit has the following relation with the total number of bits:

bit per second=average number of bits per 30 frames (30 frames= one second)×(30/n)

By the fourth embodiment as explained above, it is possible to realize the model-based coding processing interactive with the operator.

Each of the interactive processing described in the fourth embodiment can be realized by a program stored in the recording medium such as a floppy disk and a CD-ROM. For example, when the coding system 1 or the terminal 2 shown in FIG. 1 is constituted by a computer system having a structure as shown in FIG. 26, this computer system can function as the interactive model-based coding system by setting a CD-ROM 50 for storing the program which achieves the above-described functions to a CD-ROM drive 51 of the computer system.

Figure 26:
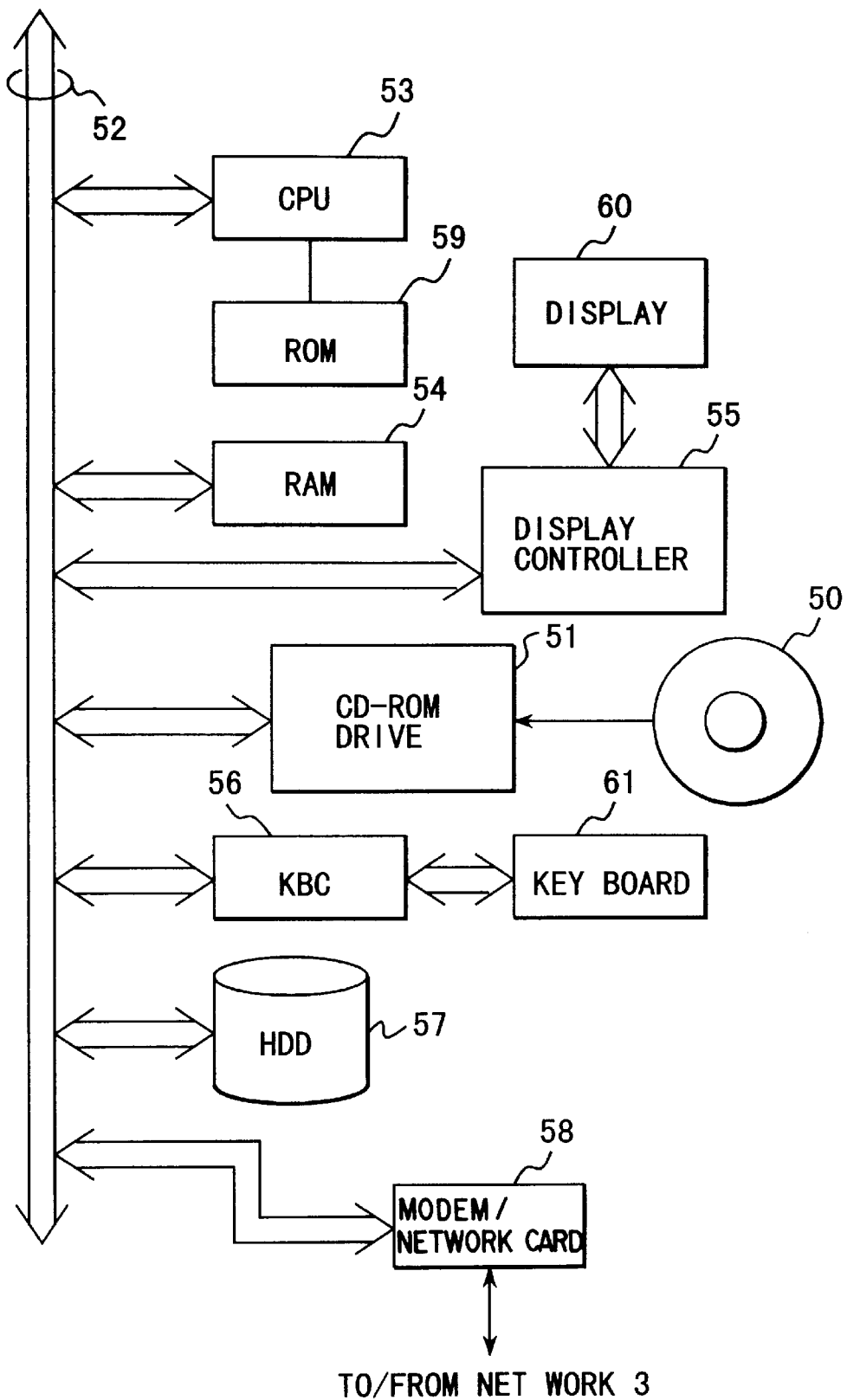
FIG. 26 is a block diagram for showing an example of a configuration of a computer system for achieving an interactive processing in the fourth embodiment.

FIG. 26 shows one example of the configuration of the computer system, and a system bus 52 is connected with a CPU 53, a RAM 54, a display controller 55, a CD-ROM drive 51, a KBC (keyboard controller) 56, an HDD (hard drive disk) 57, and a MODEM 58.

The CPU 53 is for controlling the whole of the computer system and is connected with a ROM 59 for storing a program necessary for achieving the function. The RAM 54 stores programs and data. The display controller 55 is connected with a display 60 such as a CRT or the like and carries out a display control of the display 60.

The CD-ROM drive 51 reads out the programs stored in the CD-ROM 50. The CD-ROM 50 stores programs for achieving the interactive processing as described in the fourth embodiment.

The KBC 56 is connected with a keyboard 61 and informs the instruction of the operator to the CPU 53. It is also possible to connect a coordinate input unit such as a mouse to this computer system although this is not shown in FIG. 26.

The hard disk 57 has a larger memory capacity than that of the RAM 54, for storing data and programs. The MODEM 58 is used when the computer system carries out a communication with an external system. The MODEM 58 transmits data strings coded by the above-described processing to the medium 3 or receives data transmitted from the outside.

As explained above, according to the present invention, it is possible to carry out properly the model-based coding/decoding of a first image such as a face image to be coded, based on an expression and motion of the reference image.

Further, according to the present invention, it is possible to carry out the model-based coding/decoding of an image to be coded in which there exists an object having a rigid object partially overlapped on a soft object, without involving an unnatural transformation of the rigid object.

The texture and wire-frame information of a face image which is an initial face image are transmitted to a desired terminal in a proper data format. Particularly, it is possible to transmit information with a substantially smaller amount of data than the amount of data conventionally required, which results in an improved processing efficiency.

Furthermore, according to the present invention, it is possible to provide an interactive model-based coding system suitable for interactively carrying out a model-based coding of an image.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A network comprising:

a transmission unit;

a plurality of terminals; and a data transmission path through which said transmission unit is connected to said plurality of terminals, wherein said transmission unit includes:

a first input device configured to input an image containing an image of an object;

a first storage device configured to store a plurality of image information of different objects;

a calculation device configured to calculate a combination ratio with which the plurality of image information of different objects stored in said first storage device are combined with one another to reproduce an estimate image of the object input by said first input device; and a transmission device configured to transmit the combination ratio calculated by said calculation device to a given terminal of said plurality of terminals through said data transmission path, and each of said plurality of terminals includes:

a second storage device configured to store the same image information as the plurality of image information of different objects stored in said first storage device;

a receiving device configured to receive the combination ratio which has been transmitted through said data transmission path; and a reproduction device configured to reproduce the estimate image of the object in accordance with the combination ratio received by said receiving device and the plurality of image information of different objects stored in said second storage portion.

2. A network according to claim 1, wherein the object is a face of a human being.

3. An interactive encoding system comprising:

an image input device configured to input a first image of a first object and a second image of a second object;

a storage device configured to store a standard wire-frame;

a first calculation device configured to obtain a wire-frame function W1 which transforms a first wire-frame which is fitted to the first image to the standard wire-frame;

a second calculation device configured to obtain a wire-frame function W2 which transforms the standard wire-frame to a second wire-frame which is fitted to the second image;

a first display device configured to display the first wire-frame;

an input device configured to input special feature points specified by an operator on the first wire-frame displayed by said first display device;

an extraction device configured to extract a motion parameter based on the special feature points and the second wire-frame;

a third calculation device configured to calculate a volume of a code of the extracted motion parameter and displaying the volume of the code; and a second display device configured to obtain a wire-frame function W3 which is a product of wire-frame function W2 and an inverse function $W1^{-1}$ of the wire-frame function W1, to produce a further wire-frame in accordance with the second image, the further wire-frame being fitted to the first image using the wire-frame function W3 and the motion parameter, and to display a resultant wire-frame on the first wire-frame.

4. An interactive coding system according to claim 3, further comprising a sticking device configured to stick a texture on the resultant wire-frame in accordance with a texture of the first image.

5. An interactive coding system according to claim 3, wherein said image input device is configured to input a plurality of second images showing a series of movements, and said coding system further comprising a device configured to execute processing by said second calculation device, said extraction device and said second display device with regard to the plurality of second images which have been inputted by said image input device.

6. An interactive coding system according to claim 3, wherein the resolution of said first and second display devices is higher than that of the first image of the object.

7. A computer program product comprising:

a computer storage medium and a computer program code mechanism embedded in the computer storage medium, the computer program code mechanism comprising, a first computer code device configured to control a transmission unit in a network so that the transmission unit receives an image of an object, a second computer code device configured to control a calculation of a combination ratio in which a plurality of image information relating to different objects stored in the transmission unit are combined with one another to reproduce an estimate image of the object, a third computer code device configured to control transmission of the combination ratio from the transmission unit to a given terminal of a plurality of network terminals through a data transmission network path, a fourth computer code device configured to control reception of the combination ratio at the given terminal, a fifth computer code device configured to control reproducing the estimate image of the object in accordance with the combination ratio and the plurality of image information of different objects obtained from a second storage element associated with the given terminal.

8. A computer program product comprising:

a computer storage medium and a computer program code mechanism embedded in this computer storage medium, the computer program code mechanism comprising, a first computer code device configured to control reception of a first image of a first object and a second image of a second object, a second computer code device configured to control obtaining a wire-frame function W1 by transforming a first wire-frame which is fitted to the first image to a standard wire-frame obtained from storage, a third computer code device configured to control obtaining a wire-frame function W2 by transforming the standard wire-frame to a second wire-frame which is fitted to be second image, a fourth computer code device configured to control display of the first wire-frame, a fifth computer code device configured to control receiving and processing of special feature points specified by an operator on the displayed first wire-frame, a sixth computer code device configured to control extraction of a motion parameter based on the special feature points and the second wire-frame, a seventh computer code device configured to control calculation of a volume of a code of the extracted motion parameter and controlling display thereof, and an eighth computer code device configured to control obtaining of a wire-frame function W3 as a product of the wire-frame function W2 and an inverse function $W1^{-1}$ of the wire-frame function W1, to control producing a further wire-frame in accordance with the second image, the further wire-frame being fitted to the first image using the wire-frame function W3 and the motion parameter, and to control display of a resultant wire-frame on the first wire-frame.

* * * * *